United States Patent
Rowan et al.

(10) Patent No.: US 12,060,499 B2
(45) Date of Patent: Aug. 13, 2024

(54) STRONG, REBONDABLE, DYNAMIC CROSS-LINKED CELLULOSE NANOCRYSTAL POLYMER NANOCOMPOSITE ADHESIVES

(71) Applicants: CASE WESTERN RESERVE UNIVERSITY, Cleveland, OH (US); THE UNIVERSITY OF CHICAGO, Chicago, IL (US)

(72) Inventors: Stuart J. Rowan, Chicago, IL (US); Elvis Cudjoe, Cleveland Heights, OH (US)

( * ) Notice: Subject to any disclaimer, the term of this patent is extended or adjusted under 35 U.S.C. 154(b) by 1317 days.

(21) Appl. No.: 16/610,985

(22) PCT Filed: May 7, 2018

(86) PCT No.: PCT/US2018/031374
§ 371 (c)(1),
(2) Date: Nov. 5, 2019

(87) PCT Pub. No.: WO2018/208663
PCT Pub. Date: Nov. 15, 2018

(65) Prior Publication Data
US 2020/0270488 A1    Aug. 27, 2020

Related U.S. Application Data

(60) Provisional application No. 62/502,959, filed on May 8, 2017.

(51) Int. Cl.
*C09J 101/08*    (2006.01)
*B82Y 30/00*    (2011.01)
(Continued)

(52) U.S. Cl.
CPC .......... *C09J 101/08* (2013.01); *C09J 181/04* (2013.01); *B82Y 30/00* (2013.01); *B82Y 40/00* (2013.01)

(58) Field of Classification Search
CPC ........ C09J 101/08; C09J 181/04; B82Y 30/00
(Continued)

(56) References Cited

U.S. PATENT DOCUMENTS

| 2011/0086949 | A1* | 4/2011 | Mentink | ................ B82Y 30/00 524/53 |
| 2015/0307668 | A1* | 10/2015 | Kalgutkar | ......... C08F 220/1818 528/26 |
| 2015/0368367 | A1 | 12/2015 | Hu et al. | |

FOREIGN PATENT DOCUMENTS

| CA | 2264413 A1 | 9/1999 |
| WO | 2014070092 A1 | 5/2014 |

OTHER PUBLICATIONS

Michal, B.T. et al., Stimuli-Responsive Reversible Two-Level Adhesion from a Structurally Dynamic Shape Memory Polymer, ACS Applied Materials & Interfaces, 2016, vol. 8, pp. 11041-11049.
(Continued)

*Primary Examiner* — Colin W. Slifka
(74) *Attorney, Agent, or Firm* — Hudak, Shunk & Farine Co. LPA

(57) ABSTRACT

A dynamic cross-linked polymer nanocomposite adhesive has been developed by the oxidation of a thiol functionalized semi-crystalline and/or amorphous oligomer and thiol functionalized Cellulose Nanocrystals (CNCs) to form a polydisulfide network. The resulting solid material has a melting point transition at ca. 75° C. which corresponds to the melting of the semi-crystalline and/or amorphous phase of the nanocomposite adhesive. At higher temperatures (ca. 150° C.), results in the dynamic behavior of the disulfide bond being induced, where the bonds break and reform. Two
(Continued)

levels of adhesion are obtained, in some embodiment by (1) heating the adhesive material to 80° C. (melting the semi-crystalline and/or amorphous phase) resulting in a lower modulus/viscosity of the adhesive, thus allowing better surface wetting on a substrate and (2) heating the adhesive material to 150° C. (inducing dynamic behavior of disulfide bonds), further lowers the modulus/viscosity of the adhesive ensuring a much better surface wetting and stronger adhesive bond. The polymer adhesive has been demonstrated to bind to, relatively high surface energy substrates including metal and hydrophilic glass, and to low surface energy substrates such as hydrophobic glass.

10 Claims, 17 Drawing Sheets

(51) Int. Cl.
   *B82Y 40/00*      (2011.01)
   *C09J 181/04*     (2006.01)
(58) Field of Classification Search
   USPC ........................................................ 106/202.1
   See application file for complete search history.

(56) References Cited

OTHER PUBLICATIONS

Lee, H. et al., A Reversible Wet/Dry Adhesive Inspired by Mussels and Geckos, Nature, 2007, vol. 448, pp. 338-341.
Bartlett, M.D. et al., Looking Beyond Fibrillar Features to Scale Gecko-Like Adhesion, Adv. Mater., 2012, vol. 24, pp. 1078-1083.
Qu, L. et al., Carbon Nanotube Arrays with Strong Shear Binding-On and Easy Normal Lifting-Off, Science, 2008, vol. 322, pp. 238-242.
Reddy, S. et al., Bioinspired Surfaces with Switchable Adhesion, Adv. Mater., 2007, vol. 19, pp. 3833-3837.
King, D.R. et al., Creating Gecko-Like Adhesives for "Real World" Surfaces, Adv. Mater., 2014, vol. 26, pp. 4345-4351.
Wojtecki, R.J. et al., Using the Dynamic Bond to Access Macroscopically Responsive Structurally Dynamic Polymers, Nat. Mater., 2011, vol. 10, pp. 14-27.
Lafont, U. et al., Influence of Cross-Linkers on the Cohesive and Adhesive Self-Healing Ability of Polysulfide-Based Thermosets, ACS Appl. Materials & Interfaces, 2012, vol. 4, pp. 6280-6288.
Meng, Y.Z. et al., Synthesis of Cocyclic(arylene Disulfide) Oligomers and Their Adhesion Properties as Heating-Melt Adhesive, Polymer (Guildf)., 2001, vol. 42, pp. 5215-5224.
Aubert, J.H., Thermally Removable Epoxy Adhesives Incorporating Thermally 23 Reversible Diels-Alder Adducts, The Journal of Adhesion, 2003, vol. 79, pp. 609-616.
Anderson, C.A. et al., High-Affinity DNA Base Analogs as Supramolecular, Nanoscale Promoters of Macroscopic Adhesion, J. Am. Chem. Soc., 2013, vol. 135, pp. 7288-7295.
Heinzmann, C. et al., Supramolecular Cross-Links in Poly(alkyl Methacrylate) Copolymers and Their Impact on the Mechanical and Reversible Adhesive Properties, ACS Appl. Mater. Interfaces, 2015, vol. 7, pp. 13395-13404.
Heinzmann, C. et al., Light-Induced Bonding and Debonding with Supramolecular Adhesives, ACS Appl. Mater. Interfaces, 2014, vol. 6, pp. 4713-4719.
Nakamura, T. et al., A Metal-ion-Responsive Adhesive Material via Switching of Molecular Recognition Properties, Nat. Commun., 2014, vol. 5:4622, pp. 1-9.
Geim, A.K. et al., Microfabricated Adhesive Mimicking Gecko Foot-Hair, Nat. Mater., 2003, vol. 2, pp. 461-463.
Ahn, Y. et al., Supramolecular Velcro for Reversible Underwater Adhesion, Angewandte Chem. Int. Ed., 2013, vol. 52, pp. 3140-3144.
Lafont, U. et al., Influence of Cross-Linkers on the Cohesive and Adhesive Self-Healing Ability of Polysulfide-Based Thermosets, ACS Appl. Mater. Interfaces, 2012, vol. 4, pp. 6280-6288.
Kendall, K., Crack Propagation in Lap Shear Joints, J. Phys. D. Appl. Phys., 1975, vol. 8, pp. 512-522.
Gent, A.N., Fracture Mechanics of Adhesive Bonds, Rubber Chem. Technol., 1974, vol. 47, pp. 202-212.
Malyshev, B. et al., The Strength of Adhesive Joints Using the Theory of Cracks, Int. J. Fract. Mech., 1965, vol. 1, pp. 114-128.
Chung, J.Y. et al., Soft and Hard Adhesion, J. Adhes., 2005, vol. 81, pp. 1119-1145.
Rose, S. et al., Nanoparticle Solutions as Adhesives for Gels and Biological Tissues, Nature, 2013, vol. 505, pp. 382-385.
Esposito, C.C. et al., Synthesis and Characterization of Clay—Nanocomposite Solvent-Based Polyurethane Adhesives, Int. J. Adhesion & Adhesives, 2008, vol. 28, pp. 91-100.
Kajtna, J. et al., Microsphere Pressure Sensitive Adhesives-acrylic Polymer/montmorillonite Clay Nanocomposite Materials, Int. J. Adhesion & Adhesives, 2009, vol. 29, pp. 543-550.
Wang, T. et al., Waterborne, Nanocomposite Pressure—Sensitive Adhesives with High Tack Energy, Optical Transparency and Electrical Conductivity, Ad. Mater., 2006, vol. 18, pp. 2730-2734.
Habibi, Y. et al., Cellulose Nanocrystals: Chemistry, Self-Assembly, and Applications, Chem. Rev., 2010, vol. 110, pp. 3479-3500.
Eichhorn, S.J. et al., Review: Current International Research into Cellulose Nanofibres and Nanocomposites, J. Mater. Sci., 2010, vol. 45, pp. 1-33.
Moon, R. et al., Cellulose Nanomaterials Review: Structure, Properties and Nanocomposites, Chem. Soc. Rev., 2011, vol. 40, pp. 3941-3994.
Dagnon, K.L. et al., Water-Triggered Modulus Changes of Cellulose Nanofiber Nanocomposites with Hydrophobic Polymer Matrices, Macromolecules, 2012, vol. 45, pp. 4707-4715.
Way, A.E. et al., pH-Responsive Cellulose Nanocrystal Gels and Nanocomposites, ACS Macro Lett., 2012, vol. 1, pp. 1001-1006.
Nguygen, B.N. et al., Polyimide Cellulose Nanocrystal Composite Aerogels, Macromolecules, 2016, vol. 49, pp. 1692-1703.
Capadona, J.R. et al., Stimuli-Responsive Polymer Nanocompositiese Inspired by the Sea Cucumber Dermis, Science, 2008, vol. 319, pp. 1370-1374.
Mendez, J. et al., Bioinspired Mechanically Adaptive Polymer Nanocomposites with Water-Activated Shape-Memory Effect, Macromolecules, 2011, vol. 44, pp. 6827-6835.
Cranston, E.D. et al., Direct Surface Force Measurements of Polyelectrolyte Multilayer Films Containing Nanocrystalline Cellulose, Langmuir, 2010, vol. 26, No. 22, pp. 17190-17197.
Cataldi, A. et al., A Comparison Between Micro- and Nanocellulose-Filled Composite Adhesives for Oil Paintings Restoration, Nanocomposites, 2015, vol. 4, No. 4, pp. 195-203.
Kaboorani, A. et al., Nanocrystalline Cellulose (NCC): A Renewable Nano-Material for Polyvinyl Acetate (PVA) Adhesive, Eur. Polym. J., 2012, vol. 48, pp. 1829-1837.
Zhang, H. et al., Modified Nanocrystalline Cellulose from Two Kinds of Modifiers Used for Improving Formaldehyde Emission and Bonding Strength of Urea-Formaldehyde Resin Adhesive, BioResources, 2011, vol. 6, No. 4, pp. 4430-4438.
Liu, Z. et al., Reinforcement of Lignin-Based Phenol-Formaldehyde Adhesive with Nano-Crystalline Cellulose (NCC): Curing Behavior and Bonding Property of Plywood, Mater. Sci. Appl., 2015, vol. 6, pp. 567-575.
Cudjoe, E. et al., Miscanthus Giganteus: A Commercially Viable Sustainable Source of Cellulose Nanocrystals, Carbohydr. Polym., 2017, vol. 155, pp. 230-241.
Michal, B. et al., Inherently Photohealable and Thermal Shape-Memory Polydisulfide Networks, ACS Macro Lett., 2013, vol. 2, pp. 694-699.
Parambath, K.B. et al., Biocomposites from Natural Rubber: Synergistic Effects of Functionalized Cellulose Nanocrystals as Both Reinforcing and Cross-Linking Agents via Free-Radical Thiol-ene Chemistry, ACS Appl. Mater. Interfaces, 2015, vol. 7, pp. 16303-16310.

(56) References Cited

OTHER PUBLICATIONS

Ellman, G., A Colorimetric Method for Determining Low Concentrations of Mercaptans, Arch. Biochem. Biophys., 1958, vol. 74, pp. 443-450.
Coulibaly, S. et al., Reinforcement of Optically Healable Supramolecular Polymers With Cellulose Nanocrystals, Macromolecules, 2014, vol. 47, pp. 152-160.
Siqueira, G. et al., Cellulose Whiskers versus Microfibrils: Influence of the Nature of the Nanoparticle and Its Surface Functionalization on the Thermal and Mechanical Properties of Nanocomposites, Biomacromolecules, 2009, vol. 10, pp. 425-432.
Habibi, Y., Key Advances in the Chemical Modification of Nanocelluloses, Chem. Soc. Rev., 2014, vol. 43, pp. 1519-1542.
Degennes, P.G., Wetting: Statics and Dynamics, Rev. Mod. Phys., 1985, vol. 57, No. 3, Part 1, pp. 827-863.

\* cited by examiner

STRONG, REBONDABLE, DYNAMIC CROSS-LINKED CELLULOSE NANOCRYSTAL POLYMER NANOCOMPOSITE ADHESIVES

STATEMENT REGARDING FEDERALLY SPONSORED RESEARCH OR DEVELOPMENT

This invention was made with government support under Contract W911 NF-15-1-0190 Awarded by the Department of Defense. The government has certain rights in the invention.

FIELD OF THE INVENTION

A dynamic cross-linked polymer nanocomposite adhesive has been developed by the oxidation of a thiol functionalized semi-crystalline and/or amorphous oligomer and thiol functionalized Cellulose Nanocrystals (CNCs) to form a polydisulfide network. The resulting solid material has a melting point transition at ca. 75° C. which corresponds to the melting of the semi-crystalline and/or amorphous phase of the nanocomposite adhesive. At higher temperatures (ca. 150° C.), the dynamic behavior of the disulfide bond is induced, where the bonds break and reform. Two levels of adhesion are obtained, in some embodiments, by (1) heating the adhesive material to 80° C. (melting the semi-crystalline and/or amorphous phase) resulting in a lower modulus/viscosity of the adhesive, thus allowing better surface wetting on a substrate and (2) heating the adhesive material to 150° C. where the dynamic behavior of disulfide bonds is engaged.

The polymer adhesive has been demonstrated to bind to, relatively high surface energy substrates including metal and hydrophilic glass, and to low surface energy substrates such as hydrophobic glass. Lap shear tests indicates a stronger adhesive bond for all substrates during bonding at 150° C. compared to bonding at 80° C. Increasing the content of CNCs in the polymer adhesive, increases the strength of the adhesive bond on the high energy substrates. Although the addition of CNCs as a simple filler (i.e. with no covalent crosslinking) within a disulfide adhesive enhances its adhesive strength of a disulfide network[1], it is important to note that the incorporation of thiol functionalized CNCs in a disulfide polymer is critical to achieving a stronger adhesive. For example, the adhesive with 10% thiol functionalized CNCs as a cross-linker has an adhesive strength to glass of ca. 16 MPa compared to ca. 5 MPa of a polydisulfide network adhesive with 10% CNCs as a filler.[1] Furthermore, the thiol functionalized CNCs can be incorporated into the films up to ca. 30 wt. % and show adhesive strength>50 MPa.

Compared to selected commercially available adhesives, the polydisulfide nanocomposite adhesive (ca. 62 MPa) bonds metal better than for example Gorilla Glue (ca. 4 MPa) and an epoxy based glue obtained from LORD corporation (34 MPa), with the added advantage of reversibility and debonding with light or heat (ca. 150° C.) for these new CNC-based adhesives.

BACKGROUND OF THE INVENTION

Researchers have developed an array of synthetic polymers as adhesives for a wide range of applications.[2-6] In general the approach to forming an adhesive bond involves, (1) the surface wetting of the substrate by the adhesive, which is generally dependent on pressure, time, viscosity of the adhesive and the surface energy of the two components, (2) curing of the adhesive to form a solid rigid mechanical bond between the two substrates and (3) the ability of the adhesive to transmit force/load between the adhered substrates.[7]

In recent years, researchers have turned their attention to the use of structurally dynamic materials for the formation of adhesive bonds. Dynamic materials possess dynamic bonds which undergoes continuous reversible breaking and reformation upon the application of a stimulus which results in the depolymerization of the polymer and/or exchange of lower molecular weight components of the polymer. This can lead to a dramatic reduction of the material's modulus and viscosity or a significant increase in polymer flow/creep leading to the wetting of a substrate along with an increase in contact area between the adhesive and substrate.[1,8] For example, the use dynamic covalent bonds such as disulfides[9,10] and reversible Diels Alder adducts[11] have been reported in the use of adhesives. Removal of the stimulus stops or slows down the continuous breaking and reformation between the bond allowing the material to be restored to its original modulus forming a solid rigid mechanical bond between two substrates.[1] It is also worth noting that other researchers have investigated the use of noncovalent interactions such as hydrogen bonding,[12,13] metal-ligand complexation,[14,15] or host-guest interactions[16,17] to create adhesive materials. Lafont et al.[18] studied the adhesive properties of a disulfide containing epoxy using single lap shear tests on an aluminum substrate. The adhesion of the two substrates was obtained by the thermal treatment of their adhesive at 65° C. or 100° C. while maintaining a contact pressure using a paper clip. Cooling down the lap joint to room temperature ensured the formation of an adhesive bond/joint between the two overlapped aluminum substrates. Lafont et al. demonstrated shear strengths between 0.2 to 0.5 MPa.

Theories that are used to explain adhesion[19-22] take into account the interactions and contact area between the adhesive and the substrate, as well as the room temperature modulus of the adhesive itself (i.e. the larger the modulus, the stronger the adhesion). As such, a number of studies have targeted the improvement of adhesives by incorporating fillers in order to enhance the mechanical properties.[23-26] Wang et al.[26] studied the effects of carbon nanotubes (CNT) in a poly(butyl acrylate) (P(BuA)) latex as a pressure sensitive adhesive. Their results showed that by incorporating CNTs into the P(BuA)based pressure sensitive adhesive, they obtained an adhesive that was stiff, yet dissipative enough to effectively wet the surface of a substrate, as well as increase electrical conductivity as CNT content increased in the adhesive material. In another study, Leibler and coworkers[23] reported the use of silica nanoparticles as a connector between two poly(dimethylacrylamide) (PDMA) hydrogel pieces. The concept relied on the nanoparticles ability to adsorb the PDMA network chains, forming anchor bridges between the two hydrogel pieces after the application of pressure. Adhesion strength increased with an increase in the particle size, and they also demonstrated adhesion of dehydrated gels or gels swollen in excess solvent.

Cellulose nanocrystals (CNCs) have gained a lot of attention as an important green nanofiller for nanocomposite applications due to its inherent properties such as high crystallinity, low density, high elastic moduli and high aspect ratio (depending on the source and method of isolation).[27-29] As such, CNCs have been used to reinforce numerous polymer matrices[30-35] resulting in improved mechanical properties. CNCs have also been used as a reinforcing filler for adhesive materials.[1,36-39] For example, Cataldi et al.[36] used CNCs as a reinforcing filler in a water-soluble thermoplastic adhesive, poly(2-ethyl-2-oxazoline), for oil painting restoration. Single-lap shear test between the CNC reinforced adhesive and ancient oil painting substrates, showed a significant reduction (ca. 60% lower than the neat matrix) in the adhesive displacement under creep conditions as the filler content was increased, indicative of an improved dimensional stability of the adhesive joint. In a similar fashion, Rodrigue and coworkers[39] studied the effect of incorporating CNCs into a lignin-based phenol-formaldehyde adhesive on a plywood substrate. Their results showed an increase in shear strength with up to 0.5 wt. % (based on resin solid content) CNCs, and a subsequent decrease in shear strength above this threshold. The decrease in strength was attributed to the CNC aggregation which decreased the bonding strength between the resin and the substrate.

Recently, Rowan and coworkers reported a stimuli responsive shape memory adhesive using dynamic disulfide bonds.[1] In this work, they also incorporated CNCs as a filler into the semi-crystalline cross-linked polymer network. The application of heat or UV-light resulted in the dynamic exchange of the disulfide bond which caused a drop in the modulus and viscosity of the adhesive material, promoting the wetting of a metal and glass substrate. Removal of the stimulus (heat or UV-light) resulted in the formation of a strong adhesive bond between the two substrates. Interestingly, the incorporation of CNCs as a filler resulted in the increase in the room temperature modulus of the adhesive material, subsequently increasing the shear stress of the lap shear joint at different contact pressures. For example, shear stress of the neat semi-crystalline adhesive was ca. 3 MPa compared to ca. 6 MPa for the CNC reinforced adhesive on a stainless steel substrate.

Although several research groups have investigated the use of CNCs as a nanofiller in adhesive matrices, an investigation into the use of CNCs as a cross-linking moiety, that exhibit excellent adhesive properties while at the same time being reversible, has to the best of our knowledge not been carried out.

SUMMARY OF THE INVENTION

In view of the above, the present invention relates to a dynamic semi-crystalline and/or amorphous disulfide network material using CNCs as a cross-linker that exhibits good adhesive properties. The adhesive properties as a function of temperature and pressure were investigated on different substrates.

The use of thiol functionalized CNCs in a disulfide polymer provided an adhesive having higher strength as compared to a disulfide crosslinked adhesive without the thiol functionalized CNCs.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
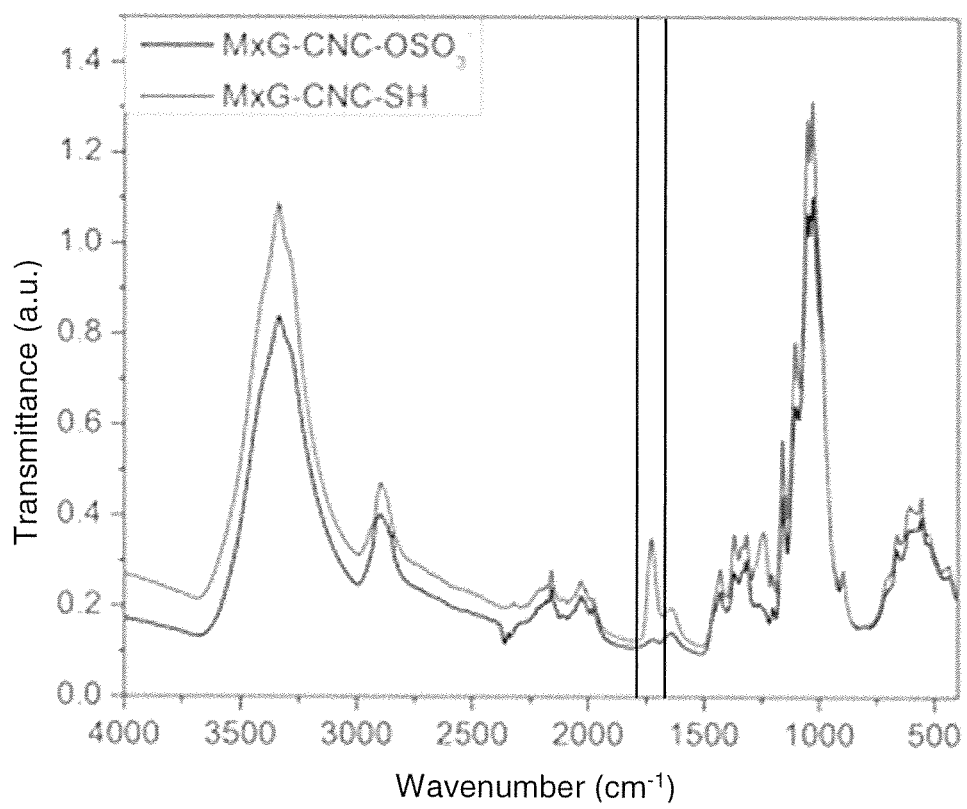
FIG. 1 illustrates the FT-IR spectrum of MxG-CNC before and after surface modification.

Adhesive compositions are disclosed herein. More specifically, dynamic cross-linked polymer nanocomposite adhesives, derived from the oxidation of a thiol functionalized semi-crystalline and/or amorphous oligomer and thiol functionalized cellulose nanocrystals that form a polydisulfide network are disclosed.

Thiol Functionalized Cellulose Nanocrystals

The thiol functionalized cellulose nanocrystals utilized in the present invention can be prepared from cellulose nanocrystals isolated from various organic sources.

Cellulose is found primarily in plants, such as wood, cotton, grass or corn, but is also present in selected marine animals such as sea tunicates, as well as algae, bacteria and fungi. Cellulose nanocrystals isolated from wood are commercially available. Cellulose nanocrystals can also be obtained from commercial microcrystalline cellulose (mCNC). Cellulose nanocrystals isolated from tunicates have higher aspect ratios (about 80) than those obtained from wood/mCNC (20-40/10-20 respectively.) The cellulose nanocrystals can also be isolated from Miscanthus x. Giganteus (MxG-CNCs) and generally have aspect ratios (60-70). The diameters range from about 2 to about 30 nm and are typically ca. 5 nm when obtained from plant resources and about 20 nm when obtained from tunicates and the lengths range from about 100 nm to about several micrometers. Methods for producing CNCs from wood, tunicates, bacteria and many plant sources are all well documented.

Methods for producing cellulose nanocrystals from Miscanthus x. Giganteus are set forth in WO 2015/095641, herein fully incorporated by reference.

While, as indicated herein, the adhesive composition includes thiol functionalized cellulose nanocrystals, cellulose nanocrystals can also be present that are not considered functionalized and/or functionalized with functional groups other than thiol groups.

Methods for forming thiol functionalized CNCs are known in the art. For example, thiol functionalized CNCs can be formed as set forth in: Biocomposites from Natural Rubber: Synergistic Effects of Functionalized Cellulose Nanocrystals as Both Reinforcing and Cross-Linking Agents via Free-Radical Thiolene, in Chemistry, *ACS Appl. Mater. Interfaces* 2015, 7(30), 16303-16310, by Parambath et al., herein incorporated by reference.

In one embodiment, thiol functionalized CNCs can be formed by mixing 3-mercaptopropionic acid (0.490 mol) with trimethylacetic anhydride or acetic anhydride (0.408 mol), 4.8 mL of glacial acetic acid and 0.1 mL of concentrated sulfuric acid in a beaker, and is allowed to cool down to room temperature after 1 h. The reaction mixture is carefully added to 5 g of MxG-CNC-OSO$_3^-$ in a rubber septum sealed 200 mL round bottom flask, using a glass syringe. The suspension is kept in an oil bath at 70° C. for 3 days with magnetic stirring. The thiol modified CNCs (MxG-CNC-SH) are precipitated in methanol followed by centrifuging. To ensure complete removal of unreacted compounds, the MxG-CNCSH solids are sonicated in methanol at 20% amplitude, followed by centrifuging to obtain MxG-CNC-SH solids. This process is repeated 3 times followed by dialysis in a 50/50 methanol/water solution for 1 day. The resulting solids are freeze dried and lyophilized to yield a white fluffy MxG-CNC-SH.

In order to provide desired properties to the compositions of the present invention, the thiol functionalized CNCs are utilized generally in an amount from about 0.1 to about 50 wt. %, desirably from about 0.25 to about 40 wt. % and preferably from about 0.5 to about 30 wt. %, based on the total weight of the thiol functionalized CNCs and the thiol functionalized semi-crystalline oligomer in the adhesive composition.

Thiol Functionalized Oligomer

The adhesive compositions of the present invention also include a thiol functionalized oligomer that can be cross-linked with thiol functionalized cellulose nanocrystals in order to form a polydisulfide network. Various thiol functionalized oligomers can be utilized as known to those as of ordinary skill in the art. In one embodiment, the thiol functionalized oligomer comprises a thiol functionalized semi-crystalline oligomer. In other embodiments, the thiol functionalized oligomer comprises thiol functionalized amorphous oligomers. In still other embodiments, mixtures of both semi-crystalline and amorphous oligomers are utilized. For example, one method for producing the thiol functionalized oligomer set forth in: Inherently Photohealable and Thermal Shape-Memory Polydisulfide Networks, *ACS Macro Lett.*, 2013, 2, 694-699, by. Michal, B. T. et al., herein incorporated by reference.

The thiol functionalized oligomer can be characterized by melting point temperature ($T_m$) or glass transition temperature ($T_g$). Thiol functionalized oligomers can be utilized having a $T_m$ or $T_g$ generally between 20° C. and 150° C., desirably between 30° C. and 100° C., and preferably between 40° C. and 80° C.

The thiol functionalized oligomer can also be synthesized from various bis-thiols, such as, but not limited to, 1,2-ethanedithiol, 1,3-propanedithiol, 1,4-butanedithiol, 1,5-pentanedithiol, 1,6-hexanedithiol, 1,8-octanedithiol, 2-mercaptoethyl ether, biphenyl-4,4"-dithiol, and p-terphenyl-4,4"-dithiol, etc., which are all commercially available from Sigma Aldrich. The total amount of thiol functionalized semi-crystalline and/or amorphous oligomer ranges in an amount generally from about 50 wt. % to about 99.9 wt. %, desirably from about 60 wt. % to about 99.25 wt. % and preferably from about 70 wt. % to about 99.5 wt. % based on the total weight of the thiol functionalized CNCs and thiol functionalized semi-crystalline and/or amorphous oligomer in the adhesive composition.

Other Components

The adhesive compositions of the present invention may also include one or more other components or additives that may further impart additional properties or characteristics to the compositions. Non-limiting examples of suitable additives include tetra(ethylene glycol) dithiol, hexa(ethylene glycol) dithiol, pentaerythritol tetrakis(3-mercaptopropionate), trimethylolpropane tris(3-mercaptopropionate), Tris (2-mercaptopropionyloxy ethyl) isocyanurate, (3-mercaptopropyl)trimethyoxysilane, and oligo(mercaptopropyl methyl) siloxane. These are all commercially available from Sigma Aldrich.

Methods for Forming the Adhesive Composition

A desired amount of the thiol functionalized CNCs is suspended in a suitable liquid, such as tetrahydrofuran (THF). A desired amount of the thiol functionalized oligomer is dissolved in a suitable solvent, such as THF. A suitable reagent, such as hydrogen peroxide in a concentration sufficient to induce desired cross-linking is added to the reaction mixture along with sodium iodide as a catalyst and mixed for a suitable period of time until gelation occurs. The gel can be broken into smaller pieces and stirred in an aqueous sodium thiosulfate solution, such as a 5% aqueous sodium thiosulfate solution, followed by de-ionized water for a period of time, such as 2 hours. The resulting solids can be dried for a period of time, such as overnight, in a vacuum oven at about 50° C.

The resulting solid is the adhesive composition, which can be further processed into a desired form, at an elevated temperature, such as 150° C. where the crystalline domain melts and disulfide exchange occurs.

Materials.

1,6-hexanedithiol, 1,5-hexadiene, phenylbis(2,4,6-trimethyl-benzoyl)phosphine oxide, sodium iodide, trimethylacetic anhydride, 5,5'dithiobis(2-nitrobenzoic acid), diiodomethane and 5 3-mercaptopropionic acid were purchased from Sigma-Aldrich. Rust-Oluem® NeverWet® rain repellent (2.5-10 wt. % triethyoxyoctylsilane), was purchased from the local Home Depot Store. All other chemicals were purchased from Fisher Scientific. All these chemicals were used without further purification. Sulfuric acid hydrolyzed CNCs were obtained from Miscanthus x Giganteus (MxG-CNC-OSO$_3^-$) following previously published procedures.[40] MxG-CNC-OSO$_3^-$ was refluxed in toluene, filtered and dried in a 50° C. vacuum oven to ensure complete water removal prior to surface functionalization.
Methods.

MxG-CNCs were dispersed using a Q500 QSonica ultrasonicator at an amplitude of 40%. MxG-CNC solids were freeze dried and lyophilized using a VirTis benchtop K lyophilizer. Ultraviolet visible spectra were collected on a Perkin-Elmer Lambda 800 spectrometer. FT-IR spectroscopy was performed on an Agilent Technologies Cary 600 series instrument over a range of 400-4000 cm$^{-1}$. Transmission Electron Microscopy (TEM) was performed on a FEI Technai F30 at 300 kV. Wide Angle X-ray Diffraction (WAXD) pattern of MxG-CNCs was obtained on a Rigaku S-MAX 3000. $^1$H and $^{13}$C NMR spectra were acquired in CDCl$_3$ on a Varian 600-MHz spectrometer. Dynamic Mechanical Analysis (DMA) temperature sweeps were performed on an RSA-G2 solids analyzer equipped with shear sandwich clamps. Temperature sweeps were performed at a heating rate of 3° C./min, a frequency of 1 Hz, and an amplitude of 20 μm. Lap Shear Adhesion tests were conducted on an MTS equipped with a 5 KN load cell. All tests were performed at a strain rate of 1 mm/min. Contact angle and surface energy measurements were performed on a Kruss EasyDrop DSA20x drop shape analyzer. For surface energy determination, contact angle measurements of deionized water and diiodomethane were used, and the Owens, Wendt, Rabel and Kaelble (OWRK) equation was used for the calculation 6 (refer to supporting information for detailed calculations). Each contact angle is the average of 5 measurements.
Synthesis of a Thiol End-Functionalized Oligomer.

The thiol functionalized oligomer was synthesized in 89% yield (by mass) following methods described previously.[41] $^1$H NMR δ (ppm): 2.49 (t, CH$_2$), 1.58 (m, CH$_2$), 1.38 (m, CH$_2$). $^{13}$C NMR δ (ppm): 33.8, 32.1, 29.5, 28.5, 28.3, 27.9, 24.5
Synthesis of Thiol Functionalized MxG-CNC-OSO$_3^-$ (MxG-CNC-SH).

MxG-CNC-SH was synthesized in 95% yield (by mass) following methods previously reported with minor modifications.[42] In short, 3-mercaptopropionic acid (0.490 mol) was mixed with trimethylacetic anhydride (0.408 mol), 4.8 mL of glacial acetic acid and 0.1 mL of concentrated sulfuric acid in a beaker, and was allowed to cool down to room temperature after 1 h. The reaction mixture was carefully added to 5 g of MxG-CNC-OSO$_3^-$ in a rubber septum sealed 200 mL round bottom flask, using a glass syringe. The suspension was kept in an oil bath at 70° C. for 3 days with magnetic stirring. The thiol modified CNCs (MxG-CNC-SH) were precipitated in methanol followed by centrifuging. To ensure complete removal of unreacted compounds, the MxG-CNCSH solids were sonicated in methanol at 20% amplitude, followed by centrifuging to obtain MxG-CNC-SH solids. This process was repeated 3 times followed by dialysis in a 50/50 methanol/water solution for 1 day. The resulting solids were freeze dried and lyophilized to yield a white fluffy MxG-CNC-SH.
Determining Thiol Content on MxG-CNC-SH.

The thiol content on MxG-CNC-SH was determined using Ellman's colorimetric method.[43] 4 mg of 5,5'dithiobis (2-nitrobenzoic acid) was dissolved in 1 mL of pH 8.5 phosphate buffer. MxG-CNC-SH was dispersed in pH 8.5 phosphate buffer at 2 mg/mL. 50 μL of 5,5'dithiobis (2-nitrobenzoic acid) stock solution was added to 2.5 mL of MxG-CNC-SH stock solution and was allowed to incubate at room temperature for 30 min. The mixture was then centrifuged and the top yellow solution was collected for ultraviolet visible spectroscopy. The thiol content was determined from the absorbance at 412 nm of the solution using a calibration curve derived from 3-mercaptopropionic acid.
Synthesis of Polydisulfide Networks.

MxG-CNC-SH were suspended in THF, via an iterative solvent exchange process[44,45] from a 3 wt. % DMF suspension. The semi-crystalline oligomer was separately dissolved in THF in a beaker at 10 wt. %. For example, to synthesize a 30 wt. % CNC polydisulfide network, 300 mg of MxG-CNC-SH (10 mL of THF suspension) were combined with 700 mg of the semi-crystalline oligomer (7 mL of THF solution) in a 50 mL beaker equipped with a magnetic stir bar. Sodium iodide (10 mg, 0.07 mmol) and hydrogen peroxide (0.3 mL) were added to the reaction mixture and gelation occurred within 4 min. The resulting gel was broken into smaller pieces and stirred in a 5% aqueous sodium thiosulfate solution, followed by deionized water for 2 h. The resulting solids were dried overnight in a vacuum oven at 50° C. The cross-linked polymer network was compression molded in a Carver laboratory press at 150° C. for 40 min to yield a 200-300 μm flexible film. The different polydisulfide networks are identified throughout based on the amount of MxG-CNC-SH incorporated, example, 30 wt. % MxG-CNC-SH.
Lap Shear Adhesion.

Lap shear adhesion tests (n=5) were conducted on a 25 mm×75 mm stainless steel, hydrophilic glass and a hydrophobic glass substrate. Hydrophobic glass substrates were prepared by spraying NeverWet® rain repellent onto a kimwipe and wiping the glass substrate in a circular motion until the surface was been fully covered. The glass substrate was allowed to dry for 15 mins and excess NeverWet® rain repellent was wiped off using a kimwipe, subsequently followed by overnight drying at room temperature. Lap joints were made by placing a 36 mm$^2$ adhesive material between two overlapping substrates on a temperature controlled hot plate at either 80° C. or 150° C. Contact pressure was maintained during adhesion by using calibration weights. Reported shear stresses are averages of 5 independent experiments and all errors are standard deviations.

Results and Discussion

Due to the availability of surface hydroxyl groups on the CNCs, several kinds of surface modifications[46] have been utilized in order to allow the incorporation of CNCs into different types of polymer matrices. Relevant to this application, the surface of MxG-CNC-OSO$_3^-$ was esterified with 3-mercaptopropionic acid in order to form a covalently cross-linked polydisulfide network (Scheme 1).

Figure 2:
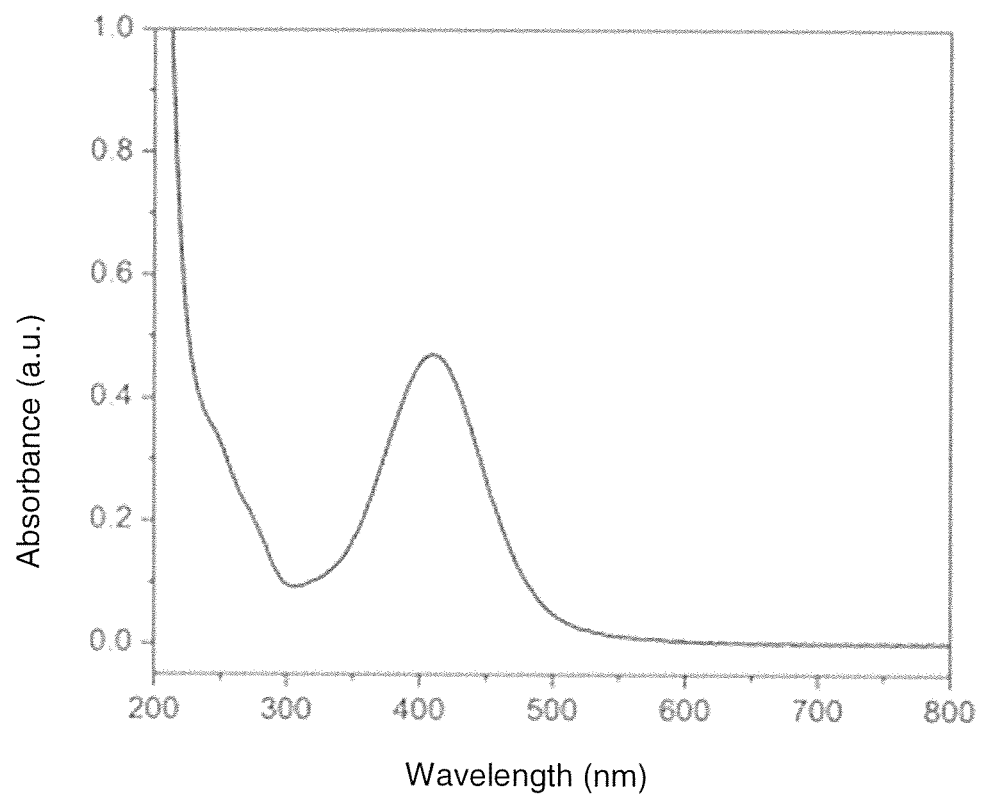
FIG. 2 illustrates the UV-Vis spectra of 5-thio-2-nitrobenzoic acid anion released from reacting MxG-CNC-SH with 5,5'-dithiobis (2-nitro-benzoic acid)
Figure 3:
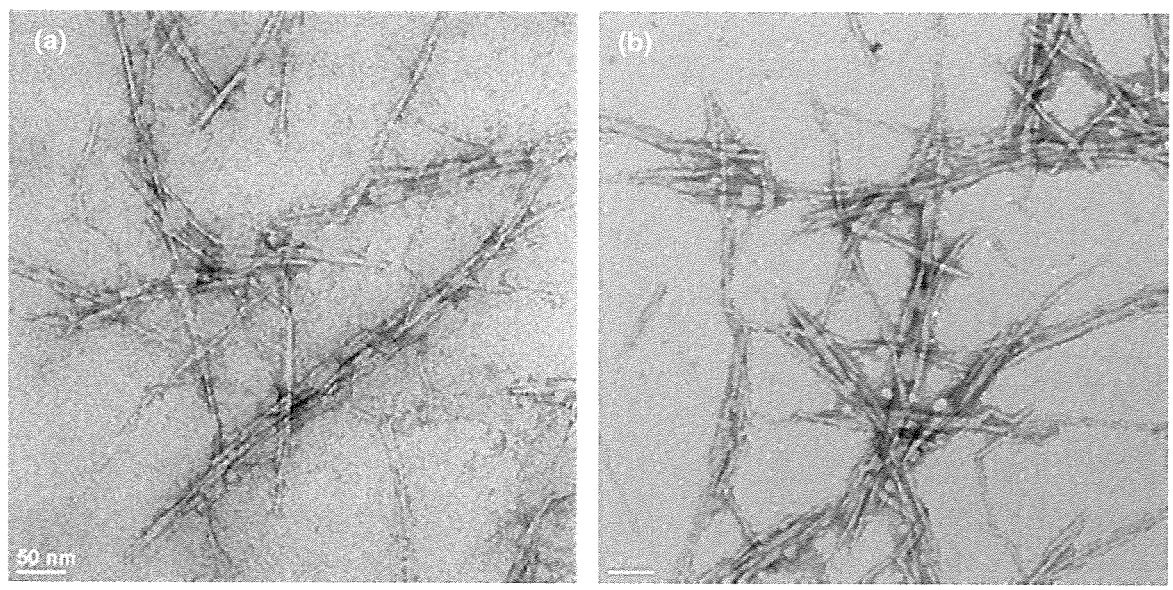
FIG. 3 illustrates the TEM image of (a) MxG-CNC-$OSO_3^-$ and (b) MxG-CNC-SH.
Figure 4:
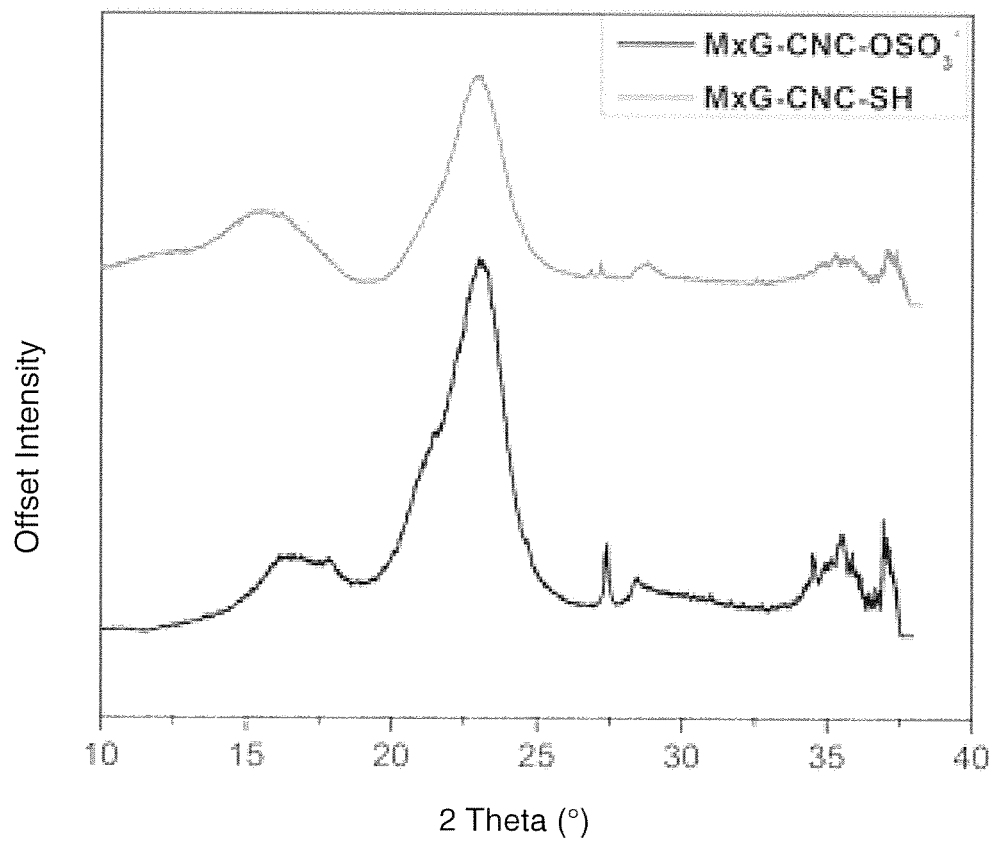
FIG. 4 illustrates the Wide Angle X-ray Diffraction patterns of MxG-CNC before and after surface modification.
Figure 5:
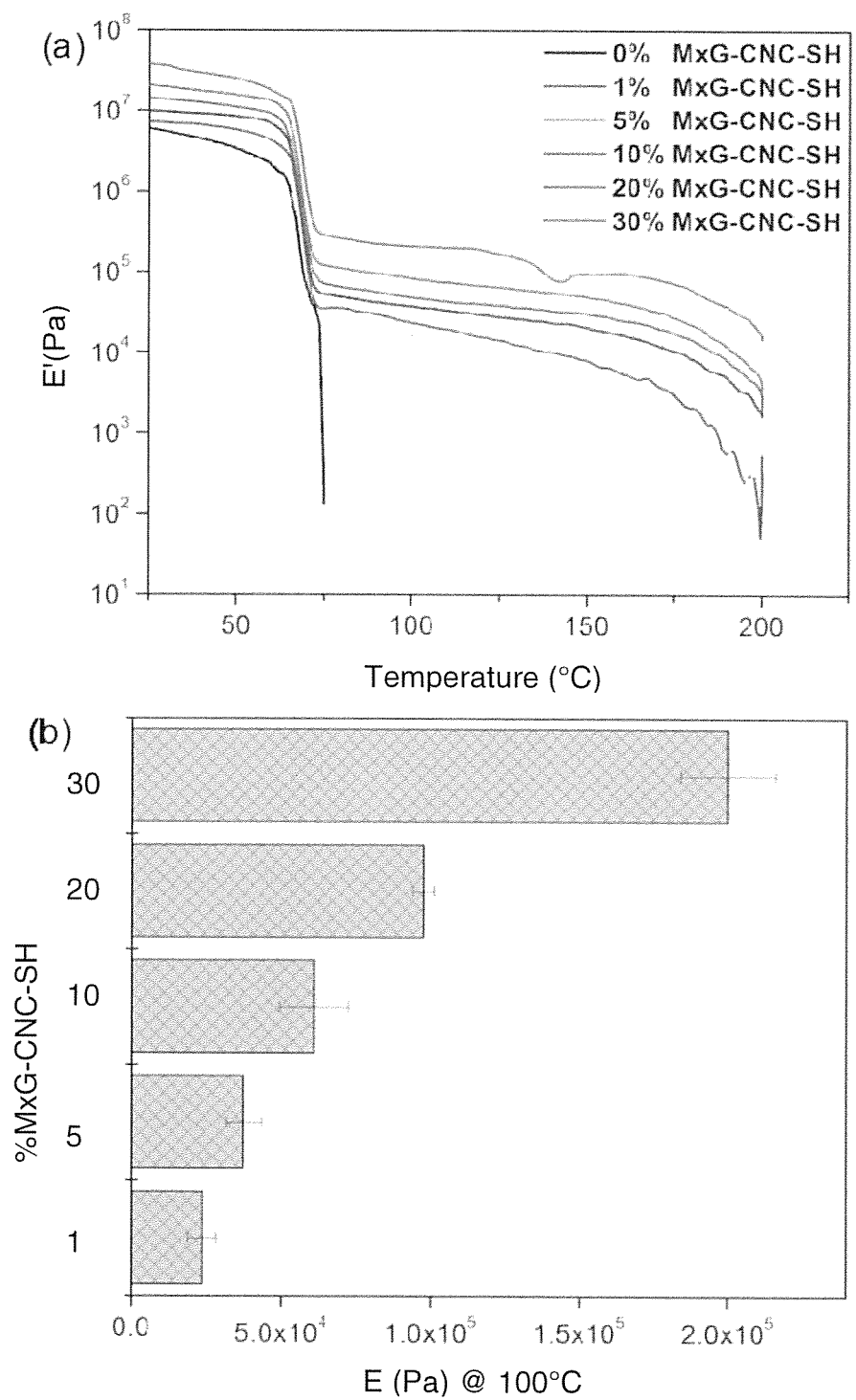
FIG. 5 illustrates (a) temperature sweeps of polydisulfide networks with varying contents of MxG-CNC-SH and (b) shear modulus of polydisulfide network with varying contents of MxG-CNC-SH; above the melting transition of the semi-crystalline phase.
Figure 6:
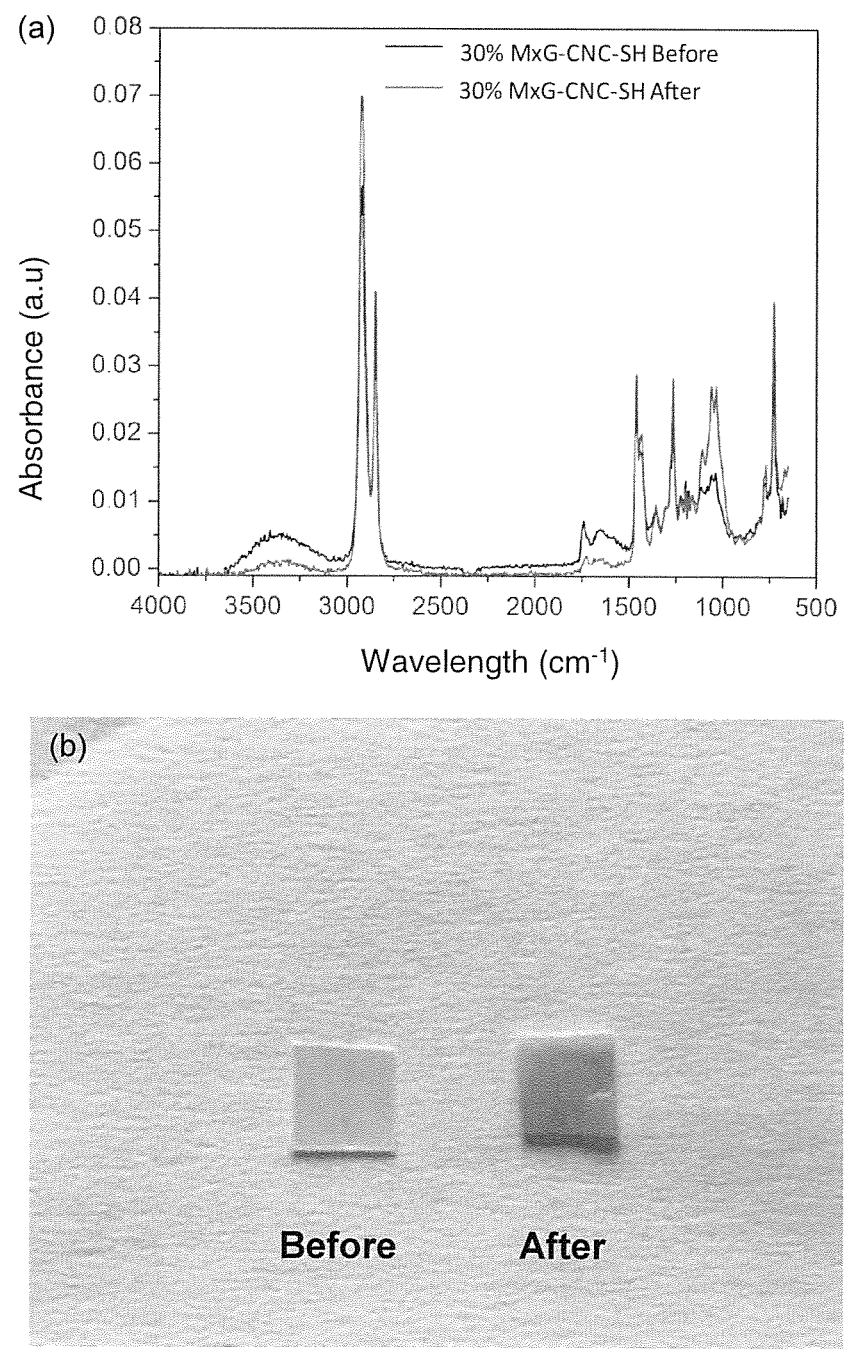
FIG. 6 illustrates (a) FT-IR of 30 wt. % MxG-CNC-SH before and after DMA temperature sweep (25-200° C.) and (b) 30 wt. % MxG-CNC-SH before and after DMA temperature sweep (25-200° C.)

Scheme 1.
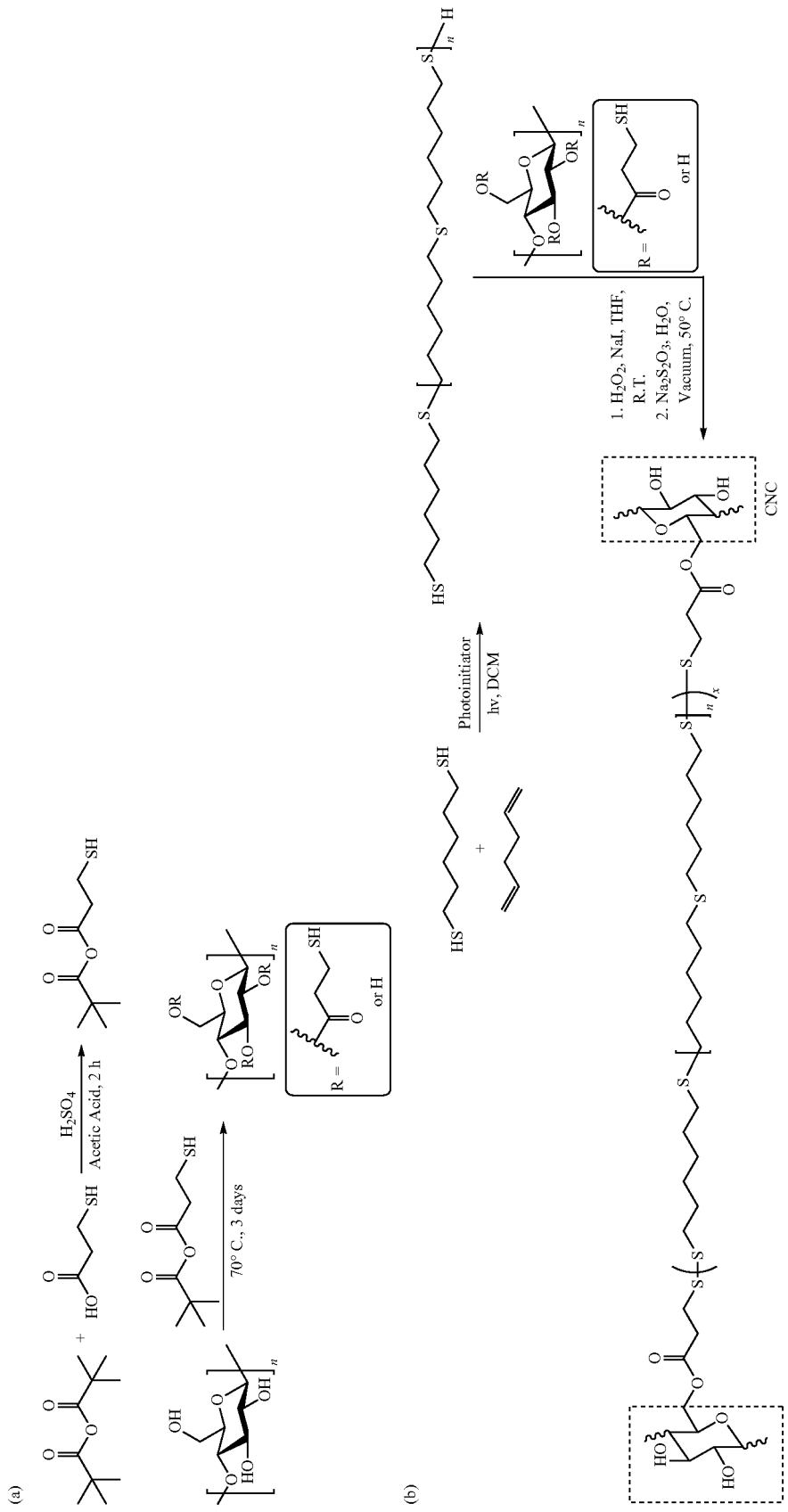
(a) Surface esterification of MxG—CNC—OSO₃ with 3-mercaptopropionic acid and (b) Polydisulfide network fabricated from the thiol oxidation of the semi-crystalline oligomer and MxG—CNC—SH Surface functionalization of MxG-CNC-OSO$_3^-$ was confirmed using FT-IR and Ellman's colorimetric thiol quantification (FIGS. 1 and 2). The signal at 1738 cm$^{-1}$ which corresponds to the carbonyl stretching of the ester derivative, confirmed the attachment of the mercapto group on MxG-CNC-SH. Furthermore, the concentration of thiol groups on the surface of MxG-CNCSH was 520 mmol/kg which was quantified by the amount of 5-thio-2-nitrobenzoic acid anion released (determined by UV-Vis spectroscopy) from the reaction of MxG-CNC-SH with 5,5'-dithiobis (2-nitro-benzoic acid). TEM images and X-ray diffraction patterns (FIGS. 3 and 4) also showed no sign of significant degradation of MxG-CNC-SH during harsh reaction conditions. Following the successful surface functionalization of MxG-CNC-SH, the polydisulfide networks were synthesized with varying amounts of MxG-CNC-SH (ca. 1-30 wt. %) as a cross-linker (samples are identified according to the amount of MxG-CNC-SH used). The thermomechanical properties of these networks were studied using DMA in shear mode deformation (FIG. 5a). The networks with different amounts of MxG-CNC-SH showed an increase in mechanical properties as the amount of MxG-CNC-SH increased, which is related to the effect of adding a rigid filler into a matrix (FIG. 5(b)). As expected, all networks showed a drop in modulus ca. 75° C., consistent with the melting transition of the semi-crystalline component of the network.[41] It is worth noting that the 30 wt. % MxG-CNC-SH showed a significant feature ca. 150° C., which may be on account of the higher CNC content resulting in more direct bonding between CNCs, i.e. CNC-S-S-CNC (without any of the semi-crystalline oligomer between the CNCs) bonds being formed. Finally, all the materials failed ca. 200° C. which may be a result (at least in part) of degradation of MxG-CNC-SH. A reduction in the relative intensity of the corresponding carbonyl peak (@ ca. 1745 cm$^{-1}$) of MxG-CNC-SH (FIG. 6(a)), as well as the discoloration (light brown) of the nanocomposite after exposure to 200° C. (FIG. 6(b)) does suggest that there is (partial) degradation at these high temperatures.

Figure 7:
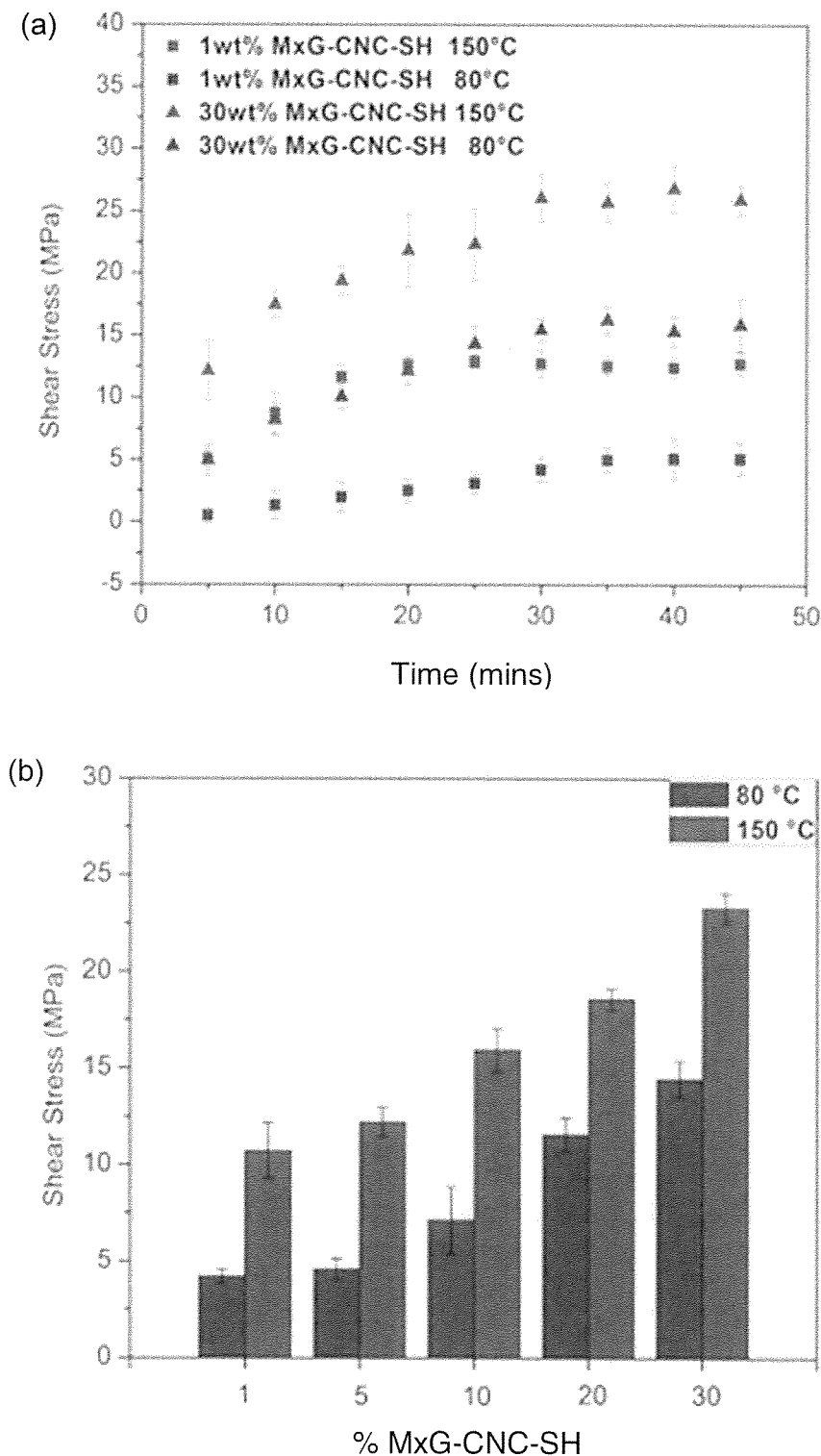
FIG. 7 illustrates (a) a lap shear adhesion time study and (b) shear stress with varying contents of MxG-CNC-SH on a metal substrate (contact pressure=0.0136 MPa, adhesive size=36 $mm^2$)
Figure 8:
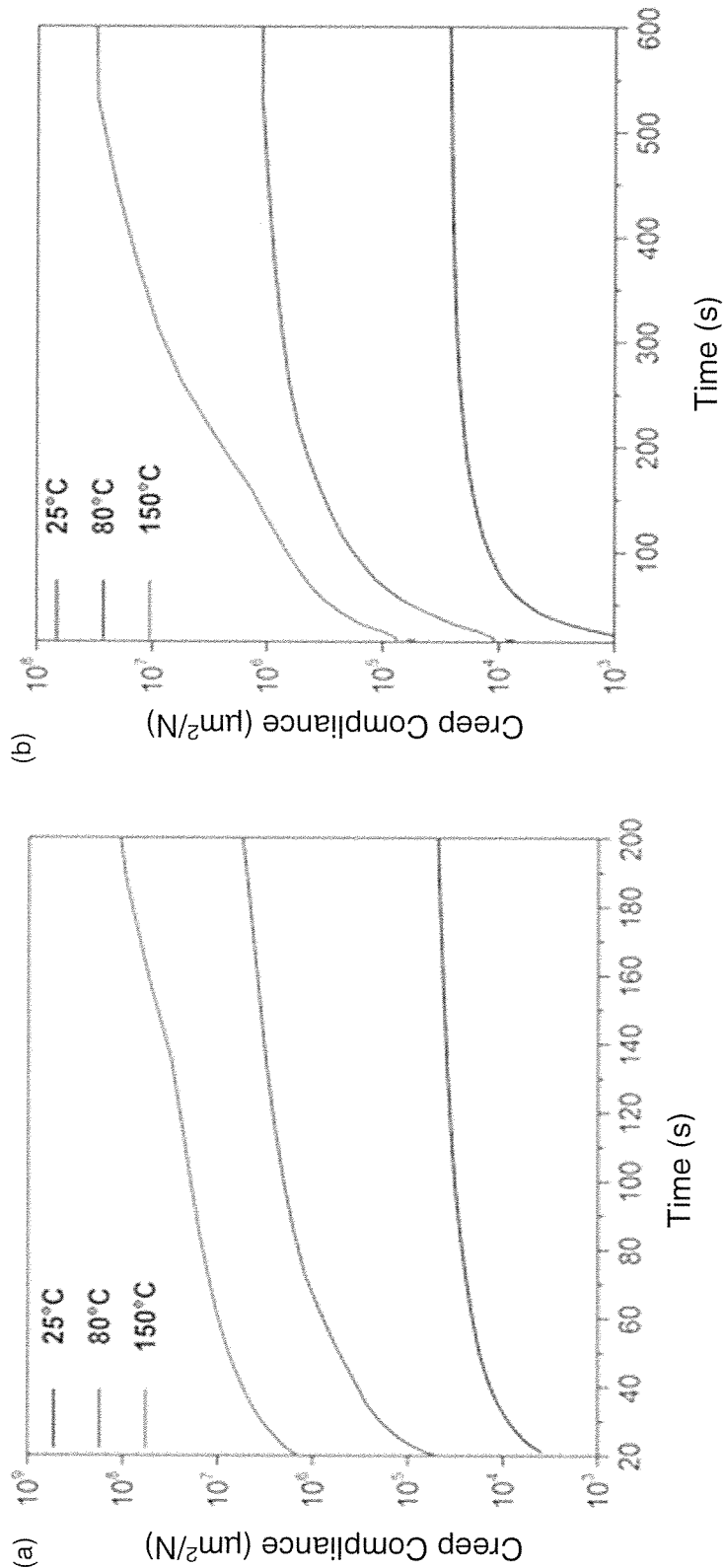
FIG. 8 illustrates Creep compliance versus time of (a) 1 wt. % MxG-CNC-SH and (b) 30 wt. % MxG-CNC-SH at different temperatures. Samples were equilibrated at their respective temperatures for 15 min, applied stress=0.0136 MPa. $2_1$ failed after 200 s at 80° C. and 150° C.
Figure 9:
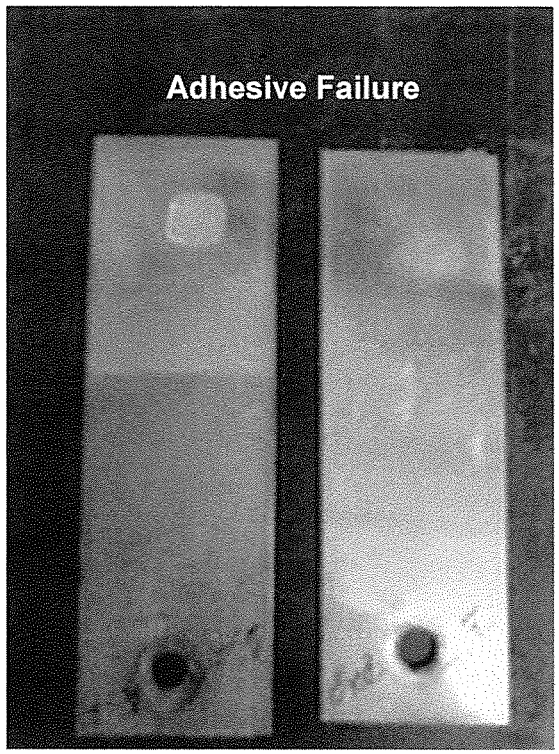
FIG. 9 illustrates lap joints after lap adhesion tests showing adhesive and cohesive failure at 80° C. and 150° C. respectively.
Figure 9:
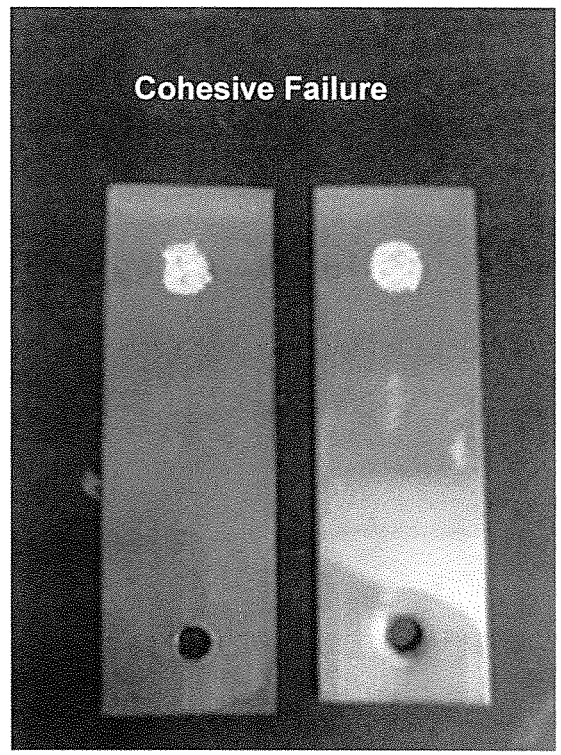

To investigate the adhesive properties of these materials, lap shear adhesion tests was conducted under two bonding conditions: (1) 80° C. where the semi-crystalline domains melt causing a drop in viscosity, and (2) 150° C. where the disulfide exchange is induced. Lap shear adhesion tests were investigated on two 25 mm×75 mm metal substrate bonded together by a 6 mm×6 mm adhesive film. Prior to bonding, time studies were conducted in order to obtain the optimum bonding time at 80 and 150° C. Results showed that maximum shear strength was obtained after bonding for ca. 20 and 30 mins at both 80 and 150° C. respectively (FIG. 7(a)) on the metal substrate, as such, bonding was conducted at both 80° C. and 150° C. for 30 mins while maintaining a constant pressure of 0.0136 MPa. In theory, shear strength of an adhesive is dependent on the room temperature modulus and the viscosity of the adhesive, with a large room temperature modulus during debonding or low viscosity during bonding favoring stronger adhesive bonds.[19,22] Lap shear adhesion tests showed an increase in shear stress with an increase in the amount of MxG-CNC-SH (FIG. 7(b)). For example, shear stress for 1 wt. % and 30 wt. % MxG-CNC-SH at 150° C. was 10.7 and 23.3 MPa respectively. Adhesive shear strength for lap joints bonded at 150° C. was higher compared to those bonded at 80° C. Creep experiments (FIGS. 8(a) and (b)) showed much higher deformation of these adhesives at higher temperatures (150° C.) resulting in better flow of the adhesive under pressure and as a result presumably increase surface wetting/surface area contact between the substrate and the adhesive. It is worth mentioning that the lap shear joints bonded at 80° C. failed adhesively (failure between adhesive and substrate interface) while lap shear joints bonded at 150° C. failed cohesively (failure within the adhesive), consistent with better surface wetting at 150° C. (FIG. 9).

Figure 10:
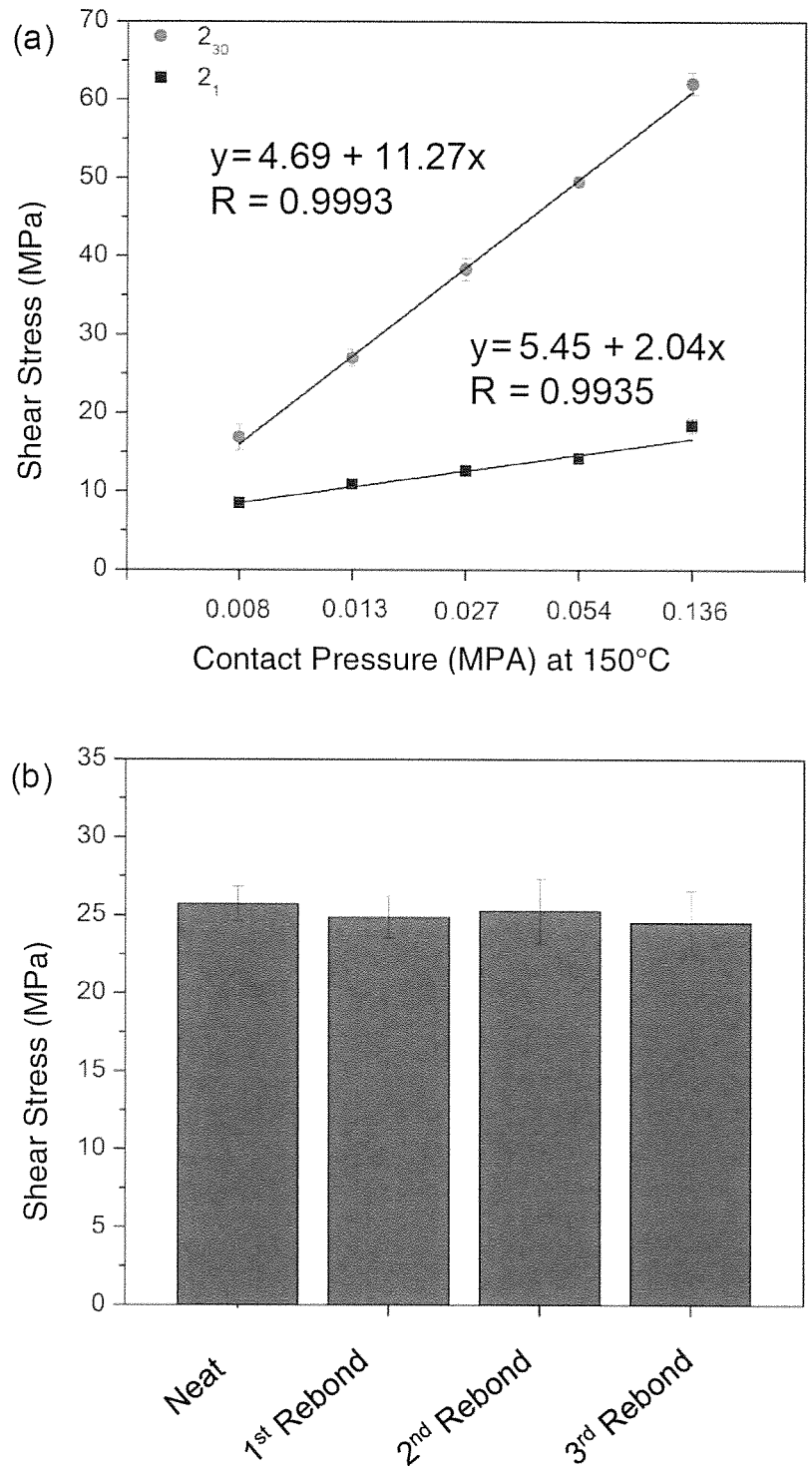
FIG. 10 illustrates lap shear stress of 30 wt. % MxG-CNC-SH on metal substrates (bonded at 150° C.) showing (a) effect of contact pressure on shear stress and (b) re-bonding of previously failed lap joints (contact pressure=0.0136 MPa, adhesive size 36 $mm^2$)

To further investigate the adhesive properties on the metal substrate, we studied the effect of pressure on the shear stress of the adhesive (30 wt. % MxG-CNC-SH) while bonding at 150° C. Results showed a close linear relationship between the shear stress and contact pressure, for example, applying a pressure of 0.008 and 0.136 MPa resulted in a shear stress of 16.9 and 62.1 MPa, respectively (FIG. 10(a)). Interestingly, 30 wt. % MxG-CNC-SH showed a much stronger response to pressure compared to 1 wt. % MxG-CNC-SH, which is presumable a consequence of the higher viscosity of 30 wt. % MxG-CNC-SH—an effect that has been observed previously in pressure sensitive adhesives.[47] Re-bonding of the adhesive was demonstrated by a repetitive sequence of breaking the lap joint and re-bonding at 150° C., and the results showed no significant degradation over three re-bonding cycles (FIG. 10(b)).

Figure 11:
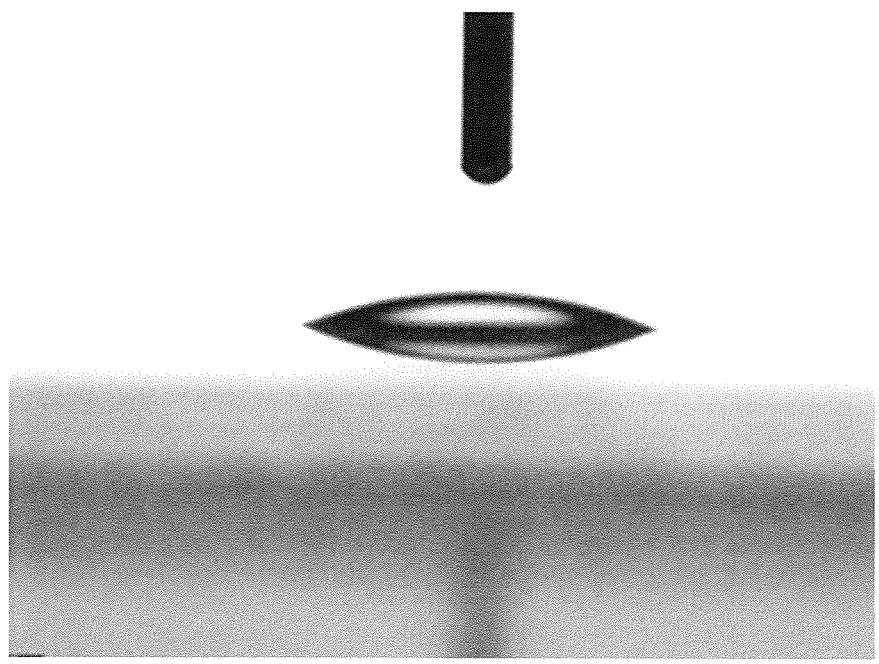
FIG. 11 illustrates the contact angle measurement on hydrophilic glass slides.
Figure 12:
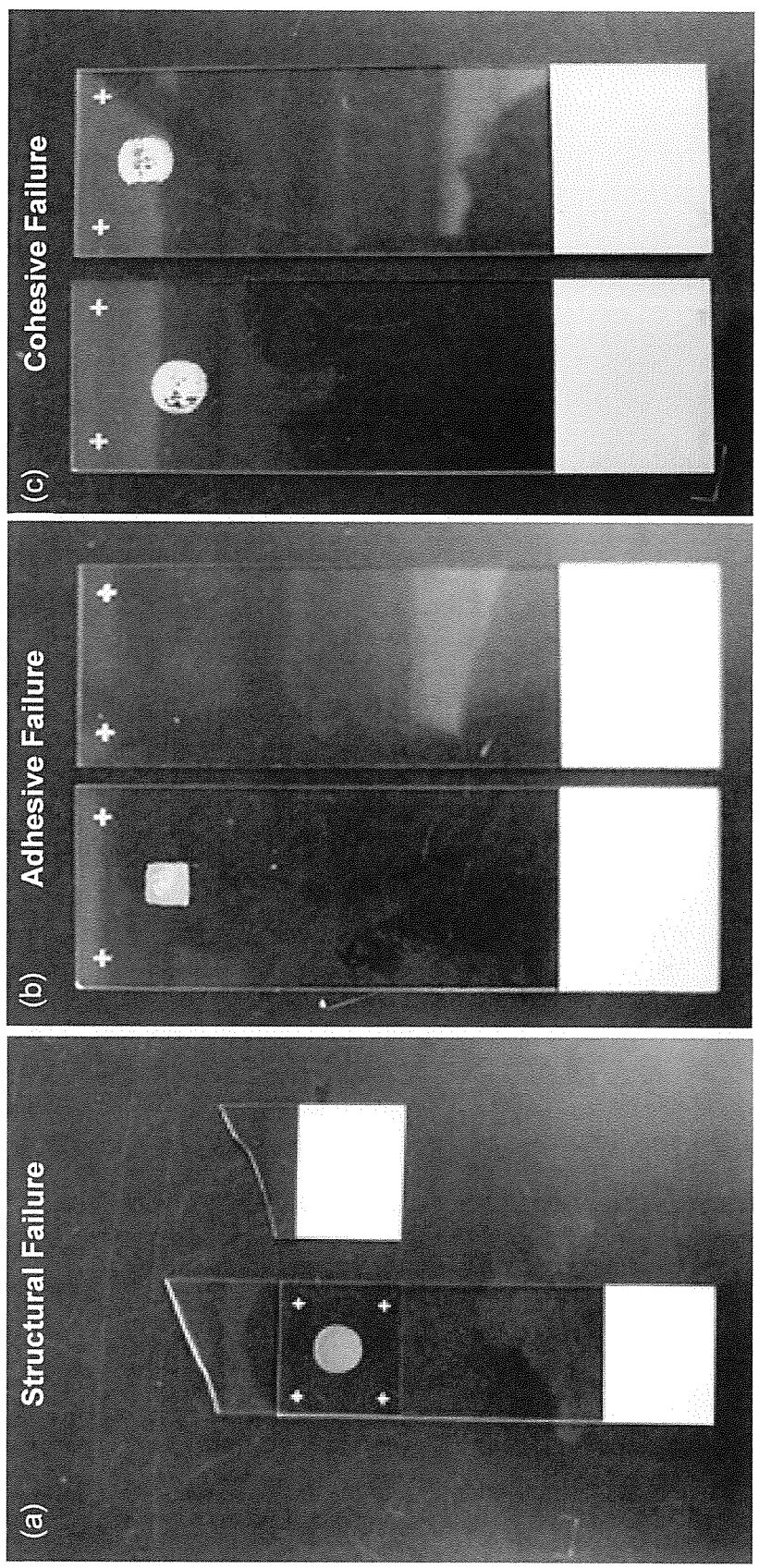
FIG. 12 illustrates failed lap shear joints on hydrophilic glass slides showing (a) structural failure with a 36 $mm^2$ 1 wt. % MxG-CNC-SH adhesive (b) adhesive failure after bonding at 80° C. and (c) cohesive failure after bonding at 150° C.

To further elucidate the utility of the adhesives, their ability to bond to glass was investigated. The glass slides were used as obtained and contact angle measurements of DI water confirmed a hydrophilic surface (ca. 23°) (FIG. 11). Initial lap shear studies on the hydrophilic glass with a 36 mm$^2$ adhesive bonded at 150° C. for 10 mins, resulted in the structural failure of the glass slide (FIG. 12(a)). Therefore, in order to reduce the force necessary to break the adhesive bond less adhesive was employed. To confirm that the measured adhesive shear strength was independent of adhesive film size lap shear experiments were carried out with 1, 4 and 9 mm$^2$ of the adhesive polymer films. Gratifyingly, no significant difference in the adhesive shear strength is observed with the change in the size of the adhesive films (Table 1). Therefore, for the hydrophilic glass lap shear studies an adhesive film with a size of 9 mm$^2$ (3×3 mm) was employed.

TABLE 1

Effect of adhesive size (1 wt. % MxG-CNC-SH) on shear stress bonded at 150° C.

| Size of Adhesive (mm$^2$) | Shear Stress (MPa) |
| --- | --- |
| 9 | 21.1 ± 2.3 |
| 4 | 20.4 ± 1.3 |
| 1 | 22.6 ± 4.1 |

Figure 13:
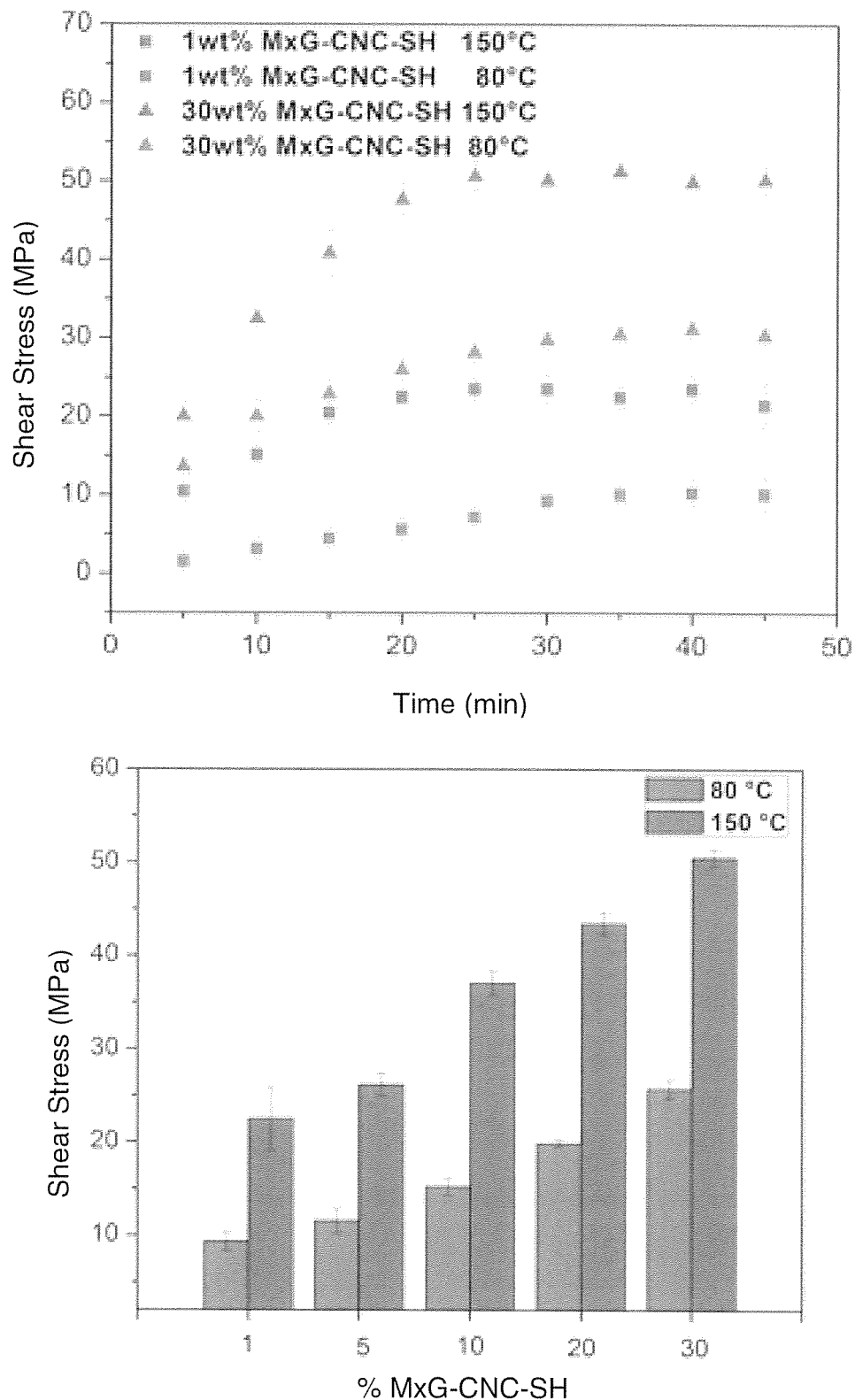
FIG. 13 illustrates (a) a lap shear adhesion time study and (b) shear stress with varying contents of MxG-CNC-SH on a hydrophilic substrate (contact pressure=0.0136 MPa). 9 $mm^2$ adhesive was used for hydrophilic glass.

As with the metal substrates, studies to obtain the optimum bonding time (at 80 and 150° C. with 0.0136 MPa contact pressure) for the hydrophilic glass substrates were carried out. Similar to before, the results suggested that the optimum hydrophilic glass substrate bonding time is ca. 30 min for both 1 and 30 wt. % MxG-CNC-SH at 80 and 150° C. (FIG. 13(a)). As such, unless otherwise stated the experiments used 30 min for the bonding process. As before, there is an increase in adhesive shear strength with an increase in MxG-CNC-SH content (FIG. 13(b)), and the lap joints failed adhesively when bonded at 80° C. (FIG. 12(b)) and cohesively when bonded at 150° C. (FIG. 12(c)). It is worth noting that the adhesive shear strength on hydrophilic glass (at a contact pressure of 0.0136 MPa) is much higher when compared to the metal substrate; for example, shear strength of 30 wt. % MxG-CNC-SH was 50.5±3.4 MPa on the hydrophilic glass compared to 23.3±0.8 MPa on the metal substrate. This effect is presumably related to the better surface wetting of the higher surface energy glass surface.[48] Contact angle experiments showed that the surface energy for the hydrophilic glass and metal substrates used in this study was ca. 110 and 60 mJ/m$^2$, respectively (Table 2).

Figure 14:
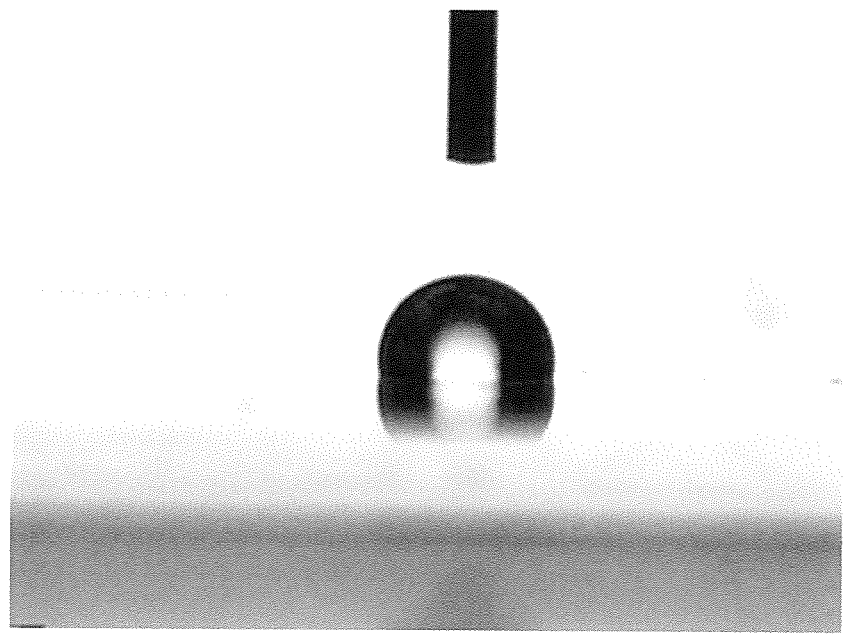
FIG. 14 illustrates the contact angle measurement on hydrophobic glass slides.
Figure 15:
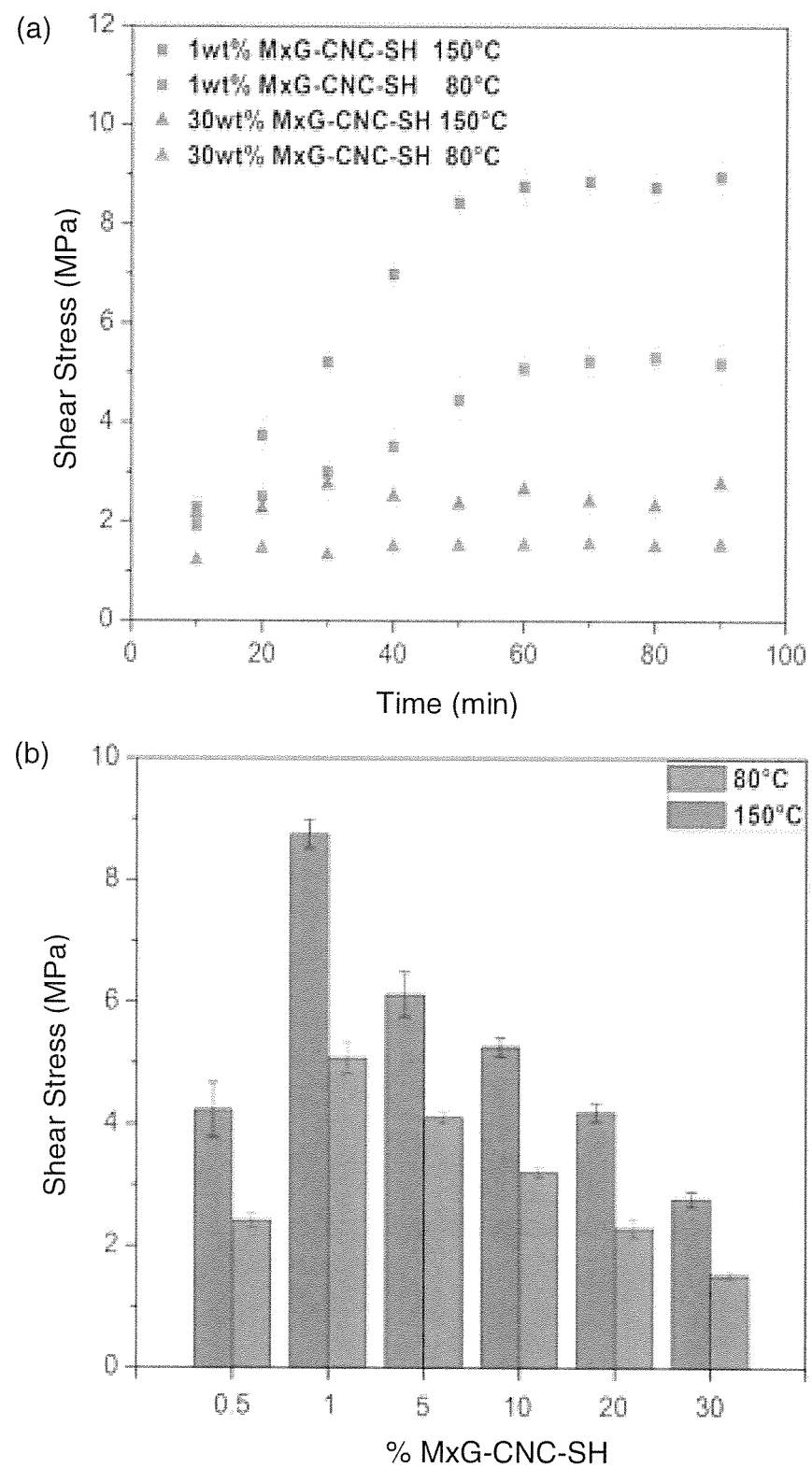
FIG. 15 illustrates (a) a lap shear adhesion time study and (b) shear stress with varying contents of MxG-CNC-SH on a hydrophobic substrate (contact pressure=0.0136 MPa)
Figure 16:
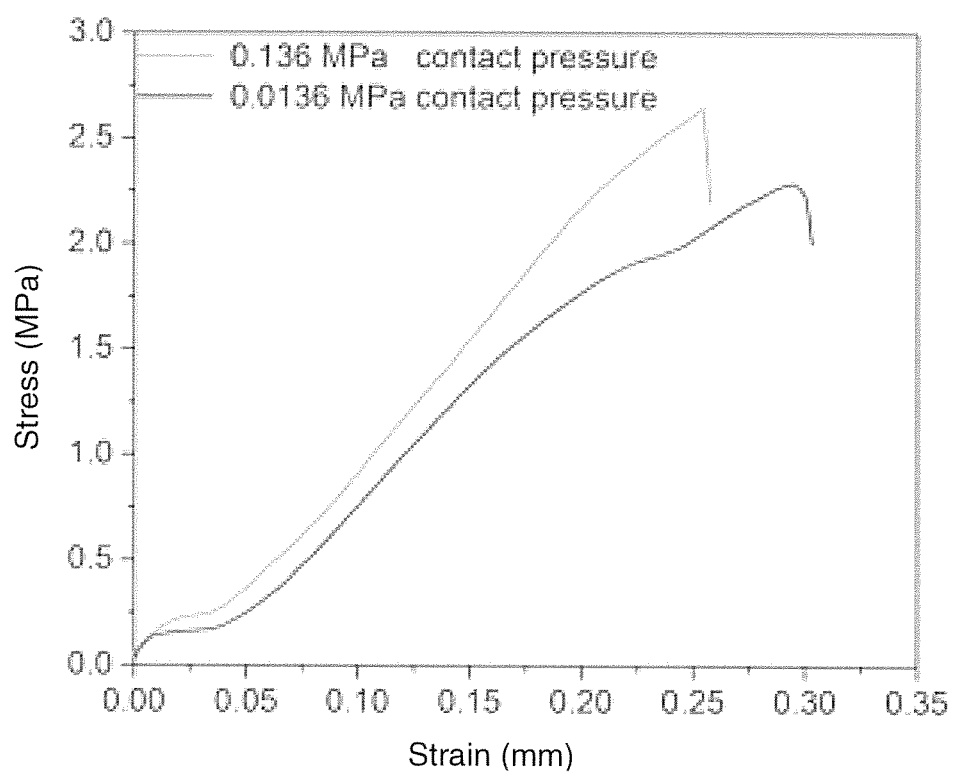
FIG. 16 illustrates Single lap shear test of 30 wt. % MxG-CNC-SH with different contact pressures while bonding at 150° C. on hydrophobic substrate.

To further examine the effect of surface wetting/surface energy, the bonding to a hydrophobic glass substrate with a relatively low surface energy (19 mJ/m$^2$) was investigated. The hydrophobic glass substrate was obtained by treating the surface of glass slides with a hydrophobic rain repellent (contains 2-10 wt. % triethoxyoctylsilane) and as expected, contact angle measurements of DI water (ca. 1020) confirmed that the surface was indeed hydrophobic (FIG. 14). As before, the optimum bonding time (at 80 and 150° C. with 0.0136 MPa contact pressure) was investigated for the hydrophobic glass substrate with the 1 and 30 wt. % MxG-CNC-SH composites. Interestingly, this time very different results compared to the higher surface energy substrates are obtained. An optimum bonding time of ca. 60 mins for 1 wt. % MxG-CNC-SH (FIG. 15a) was obtained at both 80 and 150° C., which is at least twice as long as the prior experiments. Application of higher contact pressure during bonding with 30 wt. % MxG-CNC-SH showed no change in the adhesive shear strength (2.46±0.26 MPa and 2.77±0.52 for 0.136 MPa and 0.0136 MPa contact pressure respectively) (FIG. 16).

Based on these initial studies, lap shear tests for all samples were conducted on the hydrophobic glass substrate by bonding at 80 or 150° C. for 60 mins with a contact pressure of 0.0136 MPa. FIG. 15(b) shows a general decrease in adhesive shear strength with an increase in MxG-CNC-SH content. Of the original composite samples, the 1 wt. % showed the best adhesion so an additional sample, 0.5 wt. % MxG-CNC-SH was prepared and studied. As seen in FIG. 15(b), 0.5 wt. % MxG-CNC-SH shows weaker adhesion to the hydrophobic substrate, suggesting there is a balance between composite strength (CNCs content) and hydrophobicity (matrix content) of the adhesive to ensure good adhesive bonding on the hydrophobic substrate. Of course, it is important to note that the adhesive shear strength on the hydrophobic glass is lower compared to the adhesive shear strength on the hydrophilic glass and metal, even for the 1 wt. % adhesive, (8.8±0.2 MPa, 10.7±1.4 MPa, and 22.5±1.4 MPa for hydrophobic, metal, and hydrophilic surfaces respectively). This is to be expected given the lower surface energy of the hydrophobic glass. However, it is worthwhile noting that compared to results of the related non-composite polysulfides previously studied by Michal et al.[1], an adhesive shear strength of ca. 9 MPa on the low surface energy substrate is still better than shear strength obtained with those adhesives on a high surface energy substrate (ca. 6 MPa), highlighting the positive effect of covalently incorporating CNCs into the polydisulfide network.

TABLE 2

Surface Energy and the corresponding shear stress with 30 wt. % MxG-CNC-SH of the different substrates calculated using the OWRK equation.

| Substrate | Surface Energy (mJ/m$^2$) | Shear Stress (MPa) |
| --- | --- | --- |
| Hydrophilic glass | 109.9 | 50.5 |
| Metal | 60.3 | 23.3 |
| Hydrophobic glass | 19.2 | 2.8 |

To better put the adhesive properties of this class of materials in context, the adhesive shear strength was compared to that of commercially available adhesives, namely: LORD® 310A/B (epoxy based) adhesive and Gorilla Glue. Lap shear joints were made by overlapping two metal substrates bonded with the commercially available adhesives applied onto a 36 mm$^2$ area on the metal substrate, followed by the application of 0.136 MPa of contact pressure. Higher pressure (0.136 MPa) was used in order to compare the highest adhesive shear strength of this disulfide CNC adhesive to commercially available adhesives. The LORD® 310A/B adhesive and Gorilla Glue were bonded at room temperature for 24 h and 48 h, respectively (compared to 30 min at 150° C. for 30 wt. % MxG-CNC-SH) following conditions recommended by the manufacturer in order to maximize their bonding strength. It is worth noting that in order to maximize the bonding of Gorilla Glue 48 h was required. Results showed the adhesive shear strength of 30 wt. % MxG-CNC-SH bonded to a metal substrate was much better than the LORD® 310A/B adhesive and Gorilla Glue (Table 3), although it is important to keep in mind that 30 wt. % MxG-CNC-SH needs to be bonded at 150° C., which may be limiting for some applications.

TABLE 3

Shear Stress and bonding conditions of commercially available adhesives and polydisulfide network on a metal substrate (contact pressure = 0.136 MPa for all adhesives).

| Adhesive Material | Shear Stress (MPa) | Bonding Time | Bonding Temperature |
| --- | --- | --- | --- |
| 2$_{30}$ | 62.1 ± 0.5 | 30 min | 150° C. |
| LORD ® 310A/B | 33.8 ± 1.9 | 24 h | 25° C. |
| Gorilla Glue | 4.4 ± 0.5 | 48 h | 25° C. |

Figure 17:
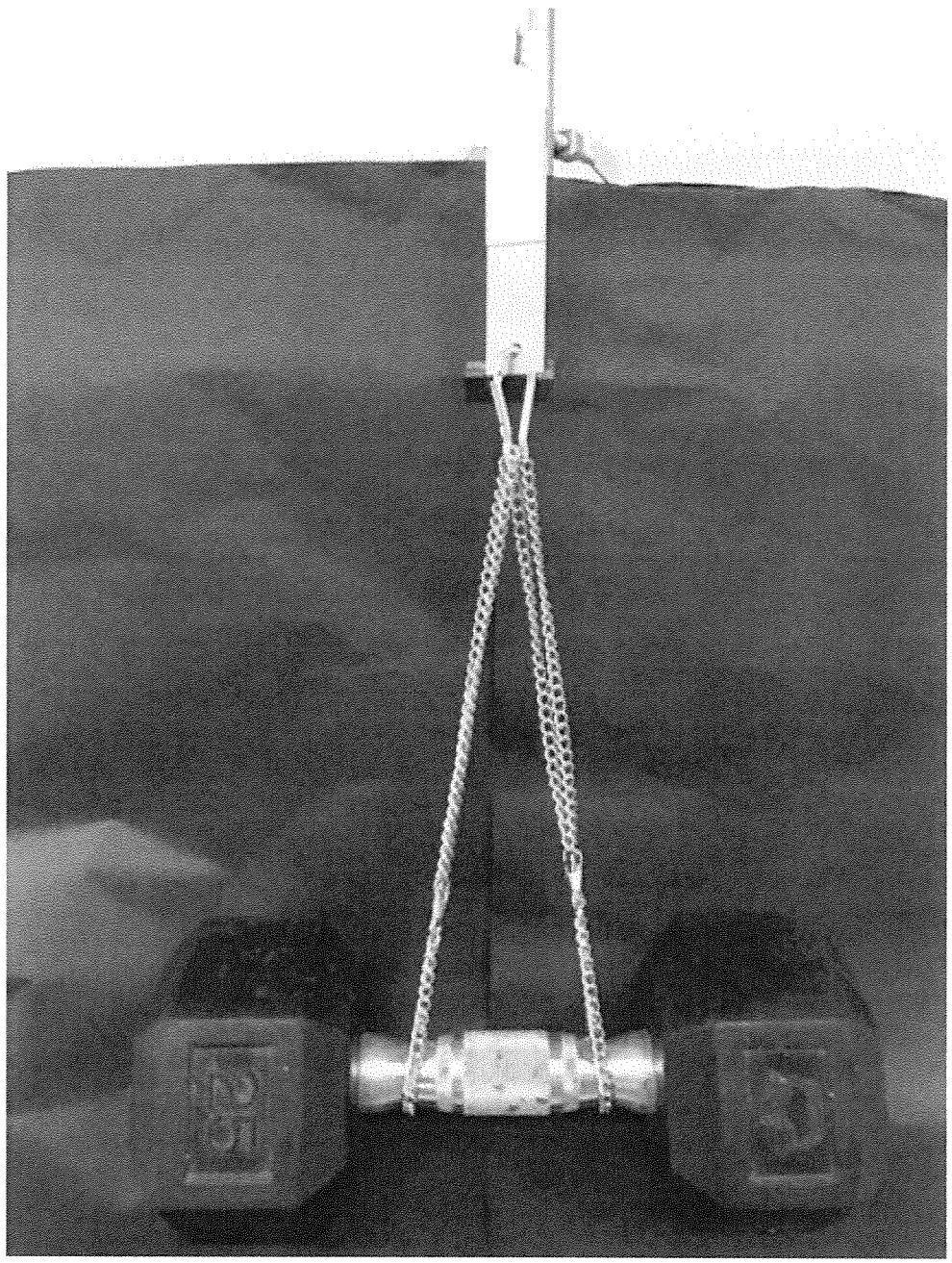
FIG. 17 illustrates a lap joint made by bonding two metal slides with a 36 $mm^2$ of 30 wt. % MxG-CNC-SH bonded at 150° C. capable of supporting a 25-pound dumbbell (Chains were used in order to mount dumbbell onto lap joint) (contact pressure=0.136 MPa).

To visually demonstrate the strength of 30 wt. % MxG-CNC-SH adhesive, its ability to support different weights were examined and it was found that a lap joint (using a 6×6 mm film of 30 wt. % MxG-CNC-SH bonding to metal plates) could support a 25-pound (11 kg) dumbbell (FIG. 17).

In accordance with the patent statutes, the best mode and preferred embodiment have been set forth; the scope of the invention is not limited thereto, but rather by the scope of the attached claims.

REFERENCES (1) Michal, B. T.; Spencer, E. J.; Rowan, S. J.; Stimuli-responsive Reversible Two-Level Adhesion from a Structurally Dynamic Shape Memory Polymer *ACS Appl. Mater. Interfaces* 2016, 8, 11041-11049.

(2) Lee, H.; Lee, B. P.; Messersmith, P. B. A Reversible Wet/dry Adhesive Inspired by Mussels and Geckos. *Nature* 2007, 448, 338-341.

(3) Bartlett, M. D.; Croll, A. B.; King, D. R.; Paret, B. M.; Irschick, D. J.; Crosby, A. J. Looking Beyond Fibrillar Features to Scale Gecko-Like Adhesion. *Adv. Mater.* 2012, 24, 1078-1083.

(4) Qu, L.; Dai, L.; Stone, M.; Xia, Z.; Wang, Z. L. Carbon Nanotube Arrays with Strong Shear Binding-On and Easy Normal Lifting-Off. *Science*. 2008, 322, 238-242.

(5) Reddy, S.; Arzt, E.; del Campo, A. Bioinspired Surfaces with Switchable Adhesion. *Adv. Mater.* 2007, 19, 3833-3837.

(6) King, D. R.; Bartlett, M. D.; Gilman, C. A.; Irschick, D. J.; Crosby, A. J. Creating Gecko-Like Adhesives for "Real World" Surfaces. *Adv. Mater.* 2014, 26, 4345-4351.

(7) Skeist, I. *Handbook of Adhesives,* 3rd ed.; Chapman & Hall: New York, 1989.

(8) Wojtecki, R. J.; Meador, M. A.; Rowan, S. J. Using the Dynamic Bond to Access Macroscopically Responsive Structurally Dynamic Polymers. *Nat. Mater.* 2011, 10 (1), 14-27.

(9) Lafont, U.; van Zeijl, H.; van der Zwaag, S. Influence of Cross-Linkers on the Cohesive and Adhesive Self-Healing Ability of Polysulfide-Based Thermosets. *ACS Appl. Mater. Interfaces* 2012, 4 (11), 6280-6288.

(10) Meng, Y. Z.; Tjong, S. C.; Hay, A. S. Synthesis of Cocyclic(arylene Disulfide) Oligomers and Their Adhesion Properties as Heating-Melt Adhesive. *Polymer (Guildf).* 2001, 42 (12), 5215-5224.

(11) Aubert, J. H. Note: Thermally Removable Epoxy Adhesives Incorporating Thermally 23 Reversible Diels-Alder Adducts. *J. Adhes.* 2003, 79 (6), 609-616.

(12) Anderson, C. A.; Jones, A. R.; Briggs, E. M.; Novitsky, E. J.; Kuykendall, D. W.; Sottos, N. R.; Zimmerman, S. C. High-Affinity DNA Base Analogs as Supramolecular, Nanoscale Promoters of Macroscopic Adhesion. *J. Am. Chem. Soc.* 2013, 135 (19), 7288-7295.

(13) Heinzmann, C.; Salz, U.; Moszner, N.; Fiore, G. L.; Weder, C. Supramolecular Cross-Links in Poly(alkyl Methacrylate) Copolymers and Their Impact on the Mechanical and Reversible Adhesive Properties. *ACS Appl. Mater. Interfaces* 2015, 7 (24), 13395-13404.

(14) Heinzmann, C.; Coulibaly, S.; Roulin, A.; Fiore, G. L.; Weder, C. Light-Induced Bonding and Debonding with Supramolecular Adhesives. *ACS Appl. Mater. Interfaces* 2014, 6 (7), 4713-4719.

(15) Nakamura, T.; Takashima, Y.; Hashidzume, A.; Yamaguchi, H.; Harada, A. A Metal-ion-Responsive Adhesive Material via Switching of Molecular Recognition Properties. *Nat. Commun.* 2014, 5, 4622.

(16) Geim, A. K.; Dubonos, S. V.; Grigorieva, I. V.; Novoselov, K. S.; Zhukov, A. A.; Shapoval, S. Y. Microfabricated Adhesive Mimicking Gecko Foot-Hair. *Nat. Mater.* 2003, 2 (7), 461-463.

(17) Ahn, Y.; Jang, Y.; Selvapalam, N.; Yun, G.; Kim, K. Supramolecular Velcro for Reversible Underwater Adhesion. *Angew. Chemie* 2013, 52 (11), 3140-3144.

(18) Lafont, U.; van Zeijl, H.; van der Zwaag, S. Influence of Cross-Linkers on the Cohesive and Adhesive Self-Healing Ability of Polysulfide-Based Thermosets. *ACS Appl. Mater. Interfaces* 2012, 4, 6280-6288.

(19) Kendall, K. Crack Propagation in Lap Shear Joints. *J. Phys. D. Appl. Phys.* 1975, 8, 512-522.

(20) Gent, A. N. Fracture Mechanics of Adhesive Bonds. *Rubber Chem. Technol.* 1974, 47, 202-212.

(21) Malyshev, B. M.; Salganik, R. L. The Strength of Adhesive Joints Using the Theory of Cracks. *Int. J. Fract. Mech.* 1965, 1, 114-128.

(22) Chung, J. Y.; Chaudhury, M. K. Soft and Hard Adhesion. *J. Adhes.* 2005, 81, 1119-1145.

(23) Rose, S.; Prevoteau, A.; Elzibre, P.; Hourdet, D.; Marcellan, A.; Leibler, L. Nanoparticle Solutions as Adhesives for Gels and Biological Tissues. *Nature* 2013, 505 (7483), 382-385.

(24) Esposito Corcione, C.; Prinari, P.; Cannoletta, D.; Mensitieri, G.; Maffezzoli, A. Synthesis and Characterization of Clay-Nanocomposite Solvent-Based Polyurethane Adhesives. *Int. J. Adhes. Adhes.* 2008, 28 (3), 91-100.

(25) Kajtna, J.; Šebenik, U. Microsphere Pressure Sensitive Adhesives-acrylic Polymer/montmorillonite Clay Nanocomposite Materials. *Int. J. Adhes. Adhes.* 2009, 29 (5), 543-550.

(26) Wang, T.; Lei, C.-H.; Dalton, A. B.; Creton, C.; Lin, Y.; Fernando, K. A. S.; Sun, Y.-P.; Manea, M.; Asua, J. M.; Keddie, J. L. Waterborne, Nanocomposite Pressure-Sensitive Adhesives with High Tack Energy, Optical Transparency, and Electrical Conductivity. *Adv. Mater.* 2006, 18 (20), 2730-2734.

(27) Habibi, Y.; Lucia, L. A.; Rojas, O. J. Cellulose Nanocrystals: Chemistry, Self-Assembly, and Applications. *Chem. Rev.* 2010, 110 (6), 3479-3500.

(28) Eichhorn, S. J.; Dufresne, A.; Aranguren, M.; Marcovich, N. E.; Capadona, J. R.; Rowan, S. J.; Weder, C.; Thielemans, W.; Roman, M.; Renneckar, S.; Gindl, W.; Veigel, S.; Keckes, J.; Yano, H.; Abe, K.; Nogi, M.; Nakagaito, A. N.; Mangalam, A.; Simonsen, J.; Benight, A. S.; Bismarck, A.; Berglund, L. A.; Peijs, T. Review: Current International Research into Cellulose Nanofibres and Nanocomposites. *J. Mater. Sci.* 2010, 45, 1-33.

(29) Moon, R. J.; Martini, A.; Nairn, J.; Simonsen, J.; Youngblood, J. Cellulose Nanomaterials Review: Structure, Properties and Nanocomposites. *Chem. Soc. Rev.* 2011, 40 (7), 3941-3994.

(30) Dagnon, K. L.; Shanmuganathan, K.; Weder, C.; Rowan, S. J. Water-Triggered Modulus Changes of Cellulose Nanofiber Nanocomposites with Hydrophobic Polymer Matrices. *Macromolecules* 2012, 45 (11), 4707-4715.

(31) Way, A. E.; Hsu, L.; Shanmuganathan, K.; Weder, C.; Rowan, S. J. pH-Responsive Cellulose Nanocrystal Gels and Nanocomposites. *ACS Macro Lett.* 2012, 1, 1001-1006.

(32) Nguyen, B. N.; Cudjoe, E.; Douglas, A.; Scheiman, D.; McCorkle, L.; Meador, M. A. B.; Rowan, S. J. Polyimide Cellulose Nanocrystal Composite Aerogels. *Macromolecules* 2016, 49, 1692-1703.

(33) Capadona, J. R.; Shanmuganathan, K.; Tyler, D. J.; Rowan, S. J.; Weder, C. Stimuli-Responsive Polymer Nanocomposites Inspired by the Sea Cucumber Dermis. *Science.* 2008, 319, 1370-1374.

(34) Mendez, J.; Annamalai, P. K.; Eichhorn, S. J.; Rusli, R.; Rowan, S. J.; Foster, E. J.; Weder, C. Bioinspired Mechanically Adaptive Polymer Nanocomposites with Water-Activated Shape-Memory Effect. *Macromolecules* 2011, 44, 6827-6835.

(35) Cranston, E. D.; Gray, D. G.; Rutland, M. W. Direct Surface Force Measurements of Polyelectrolyte Multilayer Films Containing Nanocrystalline Cellulose. *Langmuir* 2010, 26 (22), 17190-17197.

(36) Cataldi, A.; Berglund, L.; Deflorian, F.; Pegoretti, A. A Comparison between Micro- and Nanocellulose-Filled Composite Adhesives for Oil Paintings Restoration. *Nanocomposites* 2015, 1 (4), 195-203.

(37) Kaboorani, A.; Riedl, B.; Blanchet, P.; Fellin, M.; Hosseinaei, O.; Wang, S. Nanocrystalline Cellulose (NCC): A Renewable Nano-Material for Polyvinyl Acetate (PVA) Adhesive. *Eur. Polym. J.* 2012, 48 (11), 1829-1837.

(38) Zhang, H.; Zhang, J.; Song, S.; Wu, G.; Pu, J. Modified Nanocrystalline Cellulose from Two Kinds of Modifiers Used for Improving Formaldehyde Emission and Bonding Strength of Urea-Formaldehyde Resin Adhesive. *BioResources* 2011, 6 (4), 4430-4438.

(39) Liu, Z.; Zhang, Y.; Wang, X.; Rodrigue, D. Reinforcement of Lignin-Based Phenol-Formaldehyde Adhesive with Nano-Crystalline Cellulose (NCC): Curing Behavior and Bonding Property of Plywood. *Mater. Sci. Appl.* 2015, 6 (6), 567-575.
(40) Cudjoe, E.; Hunsen, M.; Xue, Z.; Way, A. E.; Barrios, E.; Olson, R. A.; Hore, M. J. A.; Rowan, S. J. Miscanthus Giganteus: A Commercially Viable Sustainable Source of Cellulose Nanocrystals. *Carbohydr. Polym.* 2017, 155, 230-241.
(41) Michal, B. T.; Jaye, C. A.; Spencer, E. J.; Rowan, S. J. Inherently Photohealable and Thermal Shape-Memory Polydisulfide Networks. *ACS Macro Lett.* 2013, 2, 694-699.
(42) Parambath Kanoth, B.; Claudino, M.; Johansson, M.; Berglund, L. A.; Zhou, Q. Biocomposites from Natural Rubber: Synergistic Effects of Functionalized Cellulose Nanocrystals as Both Reinforcing and Cross-Linking Agents via Free-Radical Thiol-ene Chemistry. *ACS Appl. Mater. Interfaces* 2015, 7 (30), 16303-16310.
(43) Ellman, G. L. A Colorimetric Method for Determining Low Concentrations of Mercaptans. *Arch. Biochem. Biophys.* 1958, 74, 443-450.
(44) Coulibaly, S.; Roulin, A.; Balog, S.; Biyani, M. V.; Foster, E. J.; Rowan, S. J.; Fiore, G. L.; Weder, C. Reinforcement of Optically Healable Supramolecular Polymers with Cellulose Nanocrystals. *Macromolecules* 2014, 47 (1), 152-160.
(45) Siqueira, G.; Bras, J.; Dufresne, A. Cellulose Whiskers versus Microfibrils: Influence of the Nature of the Nanoparticle and Its Surface Functionalization on the Thermal and Mechanical Properties of Nanocomposites. *Biomacromolecules* 2009, 10 (2), 425-432.
(46) Habibi, Y. Key Advances in the Chemical Modification of Nanocelluloses. *Chem. Soc. Rev.* 2014, 43, 1519-1542.
(47) Benedek, I. *Pressure-Sensitive Adhesives and Applications*, Second Edi.; Marcel Dekker, Inc.: New York, 2004.
(48) de Gennes, P. G. Wetting: Statics and Dynamics. *Rev. Mod. Phys.* 1985, 57, 827-863.

What is claimed is:

1. An adhesive composition, comprising:
   thiol functionalized semi-crystalline and/or amorphous oligomers; and
   thiol functionalized cellulose nanocrystals,
   wherein upon oxidation the thiol functionalized semi-crystalline and/or amorphous oligomers and the thiol functionalized cellulose nanocrystals form a dynamic polydisulfide network.

2. The adhesive composition according to claim 1, wherein the thiol functionalized cellulose nanocrystals are present in an amount from about 0.1 wt. % to about 50 wt. %, and wherein the thiol functionalized semi-crystalline and/or amorphous oligomers are present in an amount from about 50 wt. % to about 99.9 wt. %, based on the total weight of the thiol functionalized cellulose nanocrystals and thiol functionalized semi-crystalline and/or amorphous oligomers.

3. The adhesive composition according to claim 2, wherein the thiol functionalized cellulose nanocrystals are present in an amount from about 0.25 wt. % to about 40 wt. %, and wherein the thiol functionalized semi-crystalline and/or amorphous oligomer is present in an amount from about 60 wt. % to about 99.25 wt. %, based on the total weight of the thiol functionalized cellulose nanocrystals and thiol functionalized semi-crystalline and/or amorphous oligomers.

4. The adhesive composition according to claim 3, wherein the thiol functionalized cellulose nanocrystals are present in an amount from about 0.5 wt. % to about 30 wt. %, and wherein the thiol functionalized semi-crystalline and/or amorphous oligomer is present in an amount from about 70 wt. % to about 99.5 wt. %, based on the total weight of the thiol functionalized cellulose nanocrystals and thiol functionalized semi-crystalline and/or amorphous oligomers.

5. The adhesive composition according to claim 1, wherein the thiol functionalized semi-crystalline and/or amorphous oligomers have a melting point or glass transition temperature between 20° C. and 150° C.

6. The adhesive composition according to claim 5, wherein the thiol functionalized semi-crystalline and/or amorphous oligomers have a melting point or glass transition temperature between 30° C. and 100° C.

7. The adhesive composition according to claim 6, wherein the thiol functionalized semi-crystalline and/or amorphous oligomers have a melting point or glass transition temperature between 40° C. and 80° C.

8. The adhesive composition according to claim 7, wherein the thiol functionalized cellulose nanocrystals are thiol functionalized Miscanthus x. Giganteus cellulose nanocrystals.

9. The adhesive composition according to claim 1, wherein the thiol functionalized cellulose nanocrystals are thiol functionalized Miscanthus x. Giganteus cellulose nanocrystals.

10. The adhesive composition according to claim 1, wherein the adhesive composition includes the thiol functionalized semi-crystalline oligomers, and wherein the thiol functionalized semi-crystalline oligomers have a melting point or glass transition temperature between 30° C. and 100° C.

* * * * *